(12) United States Patent
Boesel et al.

(10) Patent No.: US 12,602,106 B2
(45) Date of Patent: Apr. 14, 2026

(54) AMBIENCE-DRIVEN USER EXPERIENCE

(71) Applicant: Apple Inc., Cupertino, CA (US)

(72) Inventors: Benjamin H. Boesel, Sunnyvale, CA (US); David H. Huang, San Mateo, CA (US); Jonathan Perron, Felton, CA (US); Shih-Sang Chiu, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/088,300

(22) Filed: Dec. 23, 2022

(65) Prior Publication Data

US 2023/0333641 A1 Oct. 19, 2023

Related U.S. Application Data

(63) Continuation of application No. PCT/US2021/029159, filed on Apr. 26, 2021.

(60) Provisional application No. 63/045,268, filed on Jun. 29, 2020.

(51) Int. Cl.
*G06F 3/01* (2006.01)

(52) U.S. Cl.
CPC .................................... *G06F 3/013* (2013.01)

(58) Field of Classification Search
CPC ...................................................... G06F 3/013
See application file for complete search history.

(56) References Cited

U.S. PATENT DOCUMENTS 7,096,428 B2 8/2006 Foote et al.
8,831,255 B2 9/2014 Crawford et al.

10,419,556 B2 9/2019 Fraccaroli
10,469,546 B2 11/2019 Miller
2011/0256520 A1* 10/2011 Siefert ................... G06V 40/70
434/322
2013/0101264 A1 4/2013 Vermeulen et al.
2013/0311270 A1 11/2013 Daftary et al.
(Continued)

FOREIGN PATENT DOCUMENTS

CN 106203279 A 12/2016
CN 109917911 A 6/2019
(Continued)

OTHER PUBLICATIONS

PCT International Search Report and Written Opinion dated Jul. 23, 2021, PCT International Application No. PCT/US21/29159, pp. 1-12.

(Continued)

*Primary Examiner* — David D Davis

(74) *Attorney, Agent, or Firm* — Fernando & Partners, LLP

(57) ABSTRACT

In accordance with various implementations, a method is performed at an electronic device with one or more processors, a non-transitory memory, and a display. The method includes determining an engagement score associated with an object that is visible at the display. The engagement score characterizes a level of user engagement with respect to the object. The method includes, in response to determining that the engagement score satisfies an engagement criterion, determining an ambience vector associated with the object and presenting content based on the ambience vector. The ambience vector represents a target ambient environment.

21 Claims, 22 Drawing Sheets

(56) References Cited

U.S. PATENT DOCUMENTS

| | | |
|---|---|---|
| 2014/0115055 A1 | 4/2014 | Jackson |
| 2014/0225918 A1 | 8/2014 | Mittal et al. |
| 2015/0193785 A1* | 7/2015 | Besehanic .......... G06Q 30/0201 |
| | | 705/7.32 |
| 2016/0350973 A1 | 12/2016 | Shapira et al. |
| 2017/0206691 A1* | 7/2017 | Harrises ............. G02B 27/0172 |
| 2019/0102946 A1 | 4/2019 | Spivack et al. |
| 2019/0278555 A1 | 9/2019 | Carvajal et al. |
| 2020/0005539 A1 | 1/2020 | Hwang et al. |
| 2020/0226383 A1 | 7/2020 | Meier et al. |
| 2022/0192346 A1* | 6/2022 | Mouizina ................. H04N 7/18 |

FOREIGN PATENT DOCUMENTS

| | | |
|---|---|---|
| CN | 111164540 A | 5/2020 |
| CN | 111338466 A | 6/2020 |
| TW | 424213 B | 3/2001 |
| WO | 2019067902 A1 | 4/2019 |

OTHER PUBLICATIONS

Office Action for corresponding Chinese Appl. No. 202180053251.4 dated Dec. 30, 2025 (translation of search report), 16 pages.

* cited by examiner

Figure 1:
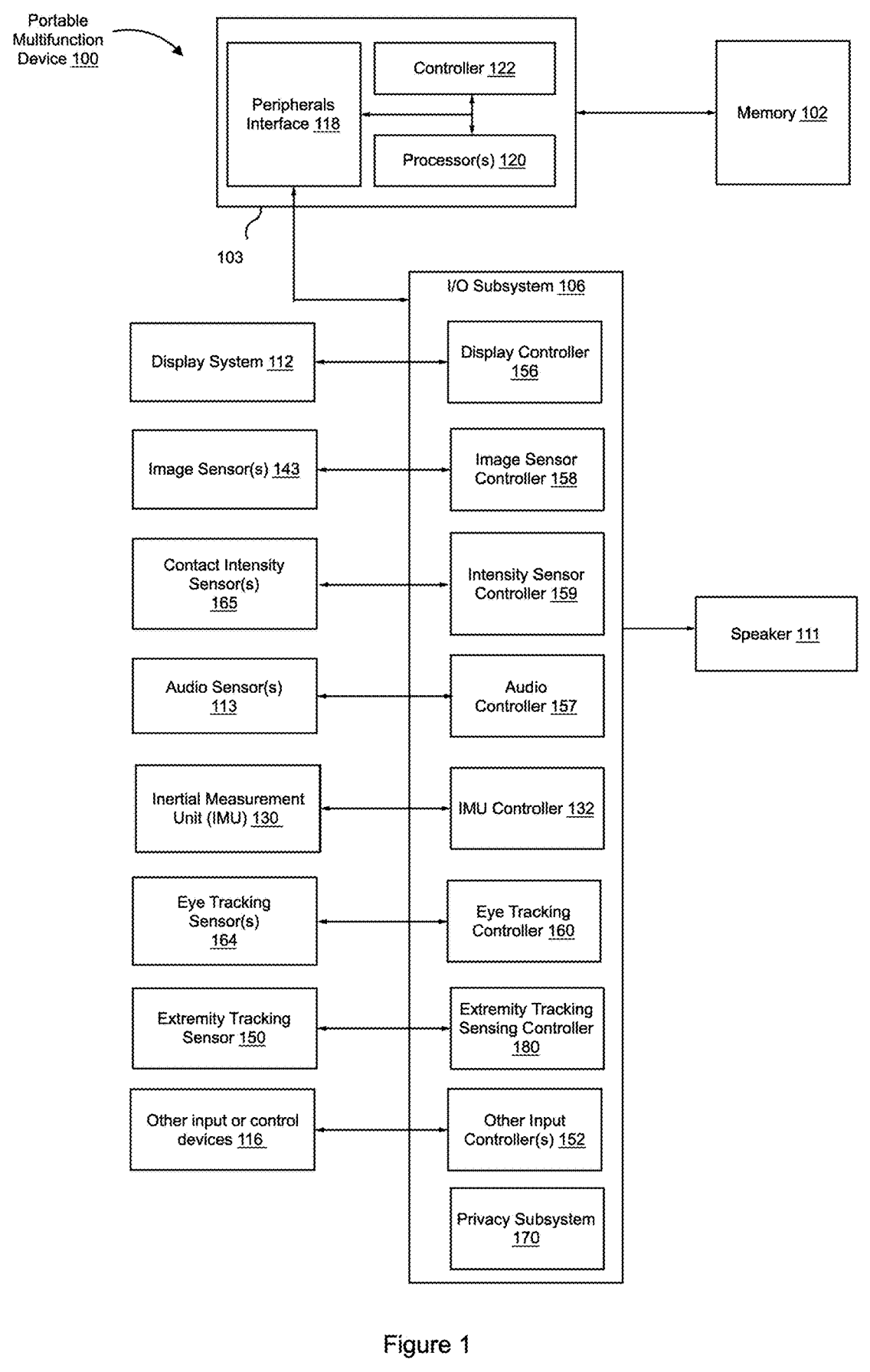

Portable
Multifunction
Device 100

Peripherals
Interface 118

Controller 122

Processor(s) 120

Memory 102

103

I/O Subsystem 106

Display System 112 → Display Controller 156

Image Sensor(s) 143 → Image Sensor Controller 158

Contact Intensity Sensor(s) 165 → Intensity Sensor Controller 159

Speaker 111

Audio Sensor(s) 113 → Audio Controller 157

Inertial Measurement Unit (IMU) 130 → IMU Controller 132

Eye Tracking Sensor(s) 164 → Eye Tracking Controller 160

Extremity Tracking Sensor 150 → Extremity Tracking Sensing Controller 180

Other input or control devices 116 → Other Input Controller(s) 152

Privacy Subsystem 170

Ceiling 218

220

242

Wall 216

222

244

224

246

226

Tracker 240

Ambience
Vector 250

| Raining 250-1 | Pouring 250-2 | Cloudy 250-3 | Dark 250-4 | ● ● ● | Nth Ambience Value 250-N |
|---|---|---|---|---|---|

First image 320
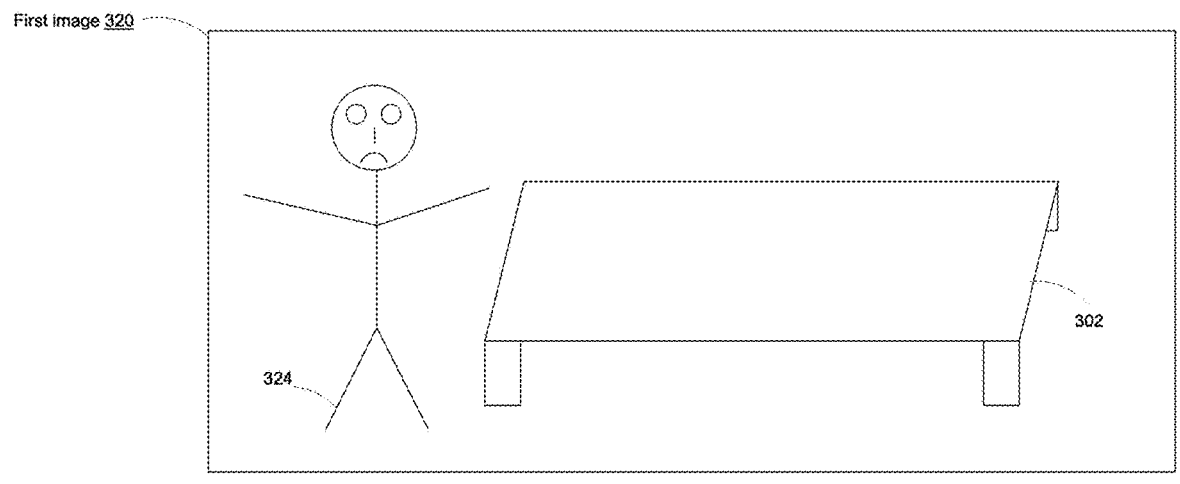
Second image 330
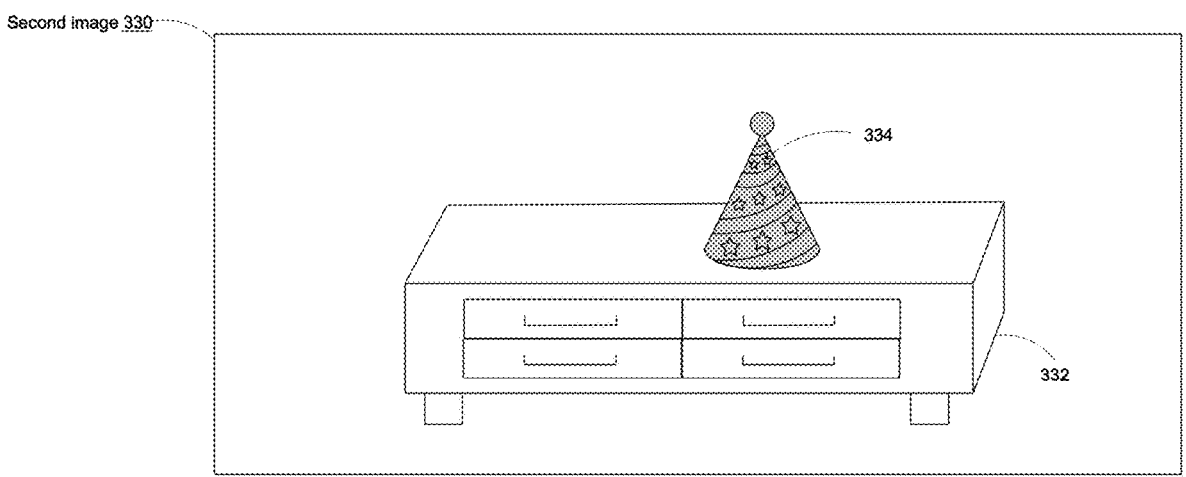
Third image 340
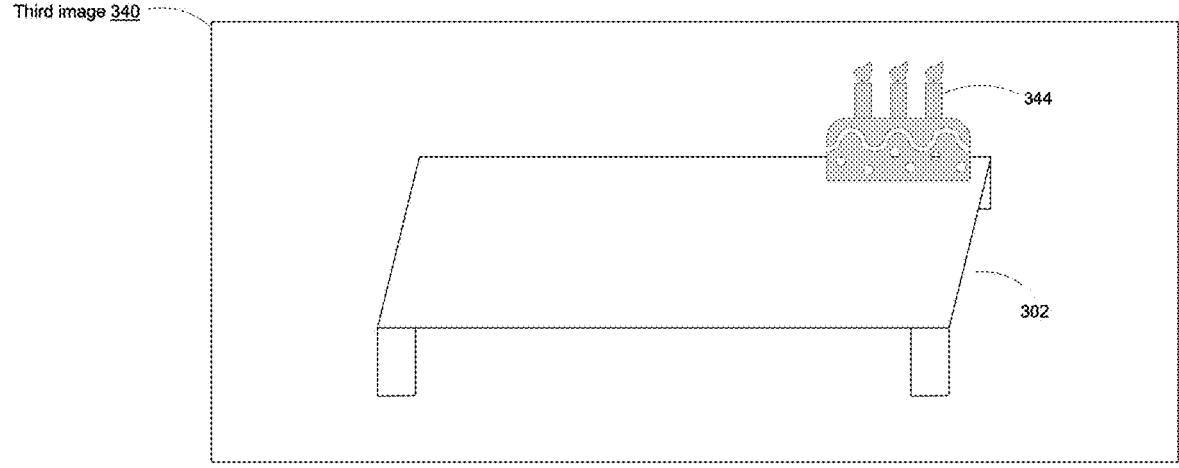
Figure 3E

500

600

700

AMBIENCE-DRIVEN USER EXPERIENCE

CROSS-REFERENCE TO RELATED APPLICATIONS

This application is a continuation application of International App No. PCT/US2021/029159, filed on Apr. 26, 2021, which is entitled to the benefit of the filing date of U.S. Provisional Patent App. No. 63/045,268, filed on Jun. 29, 2020, both of which are hereby incorporated by reference in their entirety.

TECHNICAL FIELD

The present disclosure relates to presenting content, and, in particular, presenting content based on ambience characteristics.

BACKGROUND

A previously available device may present a combination of computer-generated objects and physical objects. In some circumstances, the previously available device may modify display characteristics of certain objects or add or subtract objects. Accordingly, the previously available device may modify the user experience based on changes to an orientation or position of the previously available device relative to an operating environment associated with the previously available device. However, the previously available device does not modify the user experience based on a characteristic of a particular object with which a user is engaged. Thus, the previously available device provides a limited user experience.

SUMMARY

In accordance with some implementations, a method is performed at an electronic device with one or more processors, a non-transitory memory, and a display. The method includes determining an engagement score associated with an object visible at the display. The engagement score characterizes a level of user engagement with respect to the object. The method includes, in response to determining that the engagement score satisfies an engagement criterion, determining an ambience vector associated with the object and presenting content based on the ambience vector. The ambience vector represents a target ambient environment.

In accordance with some implementations, an electronic device includes one or more processors, a non-transitory memory, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIG. 1 is a block diagram of an example of a portable multifunction device in accordance with some implementations.

FIGS. 3A-3H are examples of presenting anchored content based on an ambience vector in accordance with some implementations.

SUMMARY

Figure 2A:
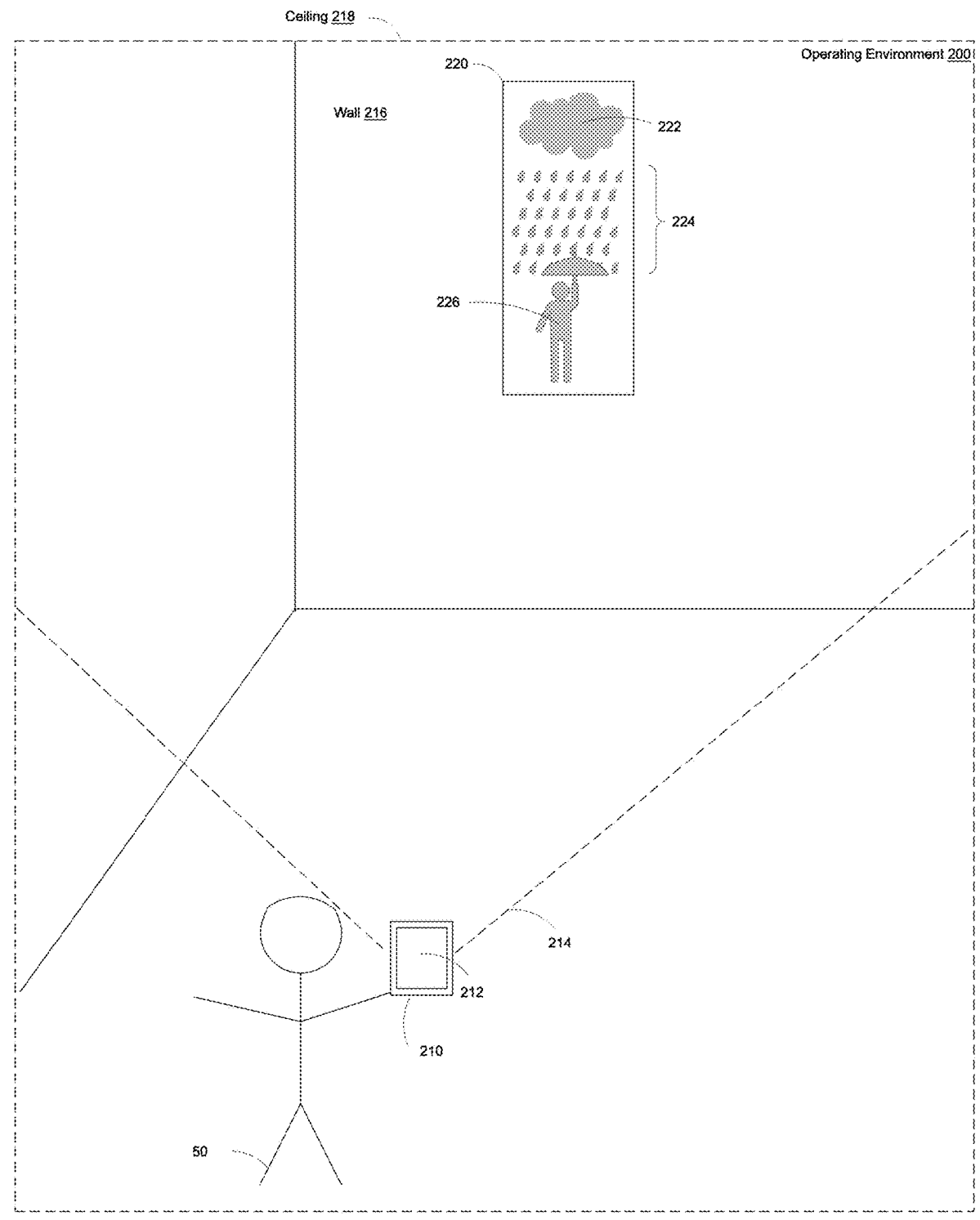
FIGS. 2A-2I are examples of presenting content based on an ambience vector in accordance with some implementations.

A device may present a combination of computer-generated objects and physical objects. In some circumstances, the device may modify display characteristics of certain objects or add or subtract objects. For example, a positional change of a head-mountable device (HMD) may result in the HMD displaying a different object or a different portion of a currently displayed object. Accordingly, the device may modify the user experience based on changes to an orientation or position of the device relative to an operating environment associated with the device. However, the device does not modify the user experience based on a characteristic of a particular object with which a user is engaged. Thus, the device provides a limited user experience.

By contrast, various implementations disclosed herein include methods, electronic devices, and systems for presenting (e.g., displaying or playing audio) content based on an ambience vector. To that end, an electronic device, with a display, determines an engagement score associated with an object visible at the display. The engagement score characterizes a level of user engagement with respect to the object, such as how long a user is focused on the object. In some implementations, the electronic device utilizes extremity tracking and/or eye tracking in order to determining the engagement score. For example, the electronic device determines, based on eye gaze data and image sensor data, a user is looking at a portion of the object.

The electronic device determines whether or not the engagement score satisfies an engagement criterion. For example, the engagement score satisfies the engagement criterion when extremity tracking data indicates that the user is engaged with the object for a threshold amount of time. As another example, the engagement score satisfies the engagement criterion when the object is of a particular object type, such as a painting or picture.

In response to determining that the engagement score satisfies the engagement criterion, the electronic device determines an ambience vector associated with the object and presents content that is based on the ambience vector. The ambience vector represents a target ambient environment. In some implementations, the ambience vector includes one or more values that characterize an ambient light, sound, mood, or weather of the target ambient environment. For example, the ambience vector includes lighting values, sound values, mood values, etc. For example, in some implementations, the ambience vector includes a low lighting value when the object corresponds to a static image depicting a nighttime scene. As another example, when the object includes a representation of raindrops, the electronic device displays computer-generated raindrops or plays spatial audio to simulate raindrops landing on the ceiling of an operating environment associated with the electronic device. In some implementations, the electronic device transmits instructions instructing a secondary device (e.g., a smart home system) to modify the user experience, such as instructing a lighting system to dim the lights. In some implementations, anchored (e.g., previously captured) content is spatially aligned with an identified portion of a current operating environment associated with the electronic device.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Various examples of electronic systems and techniques for using such systems in relation to various computer-generated reality technologies are described.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a key board, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to an operating environment. In some implementations, the other input or control devices 116 include a depth sensor and/or a time of flight sensor that obtains depth information characterizing an operating environment.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 has a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a stylus.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within an operating environment. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2I are examples of presenting content based on an ambience vector in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 2A, an electronic device 210 is associated with an operating environment 200. For example, in some implementations, the operating environment 200 includes a combination of computer-generated object and physical objects. In some implementations, the operating environment 200 is one of the XR settings described above. The electronic device 210 is being held by a user 50. In some implementations, the electronic device 210 corresponds to a mobile device, such as a smartphone, laptop, tablet, etc. In some implementations, the electronic device 210 is similar to and adapted from the electronic device 100 in FIG. 1.

In some implementations, the electronic device 210 corresponds to a head-mountable device (HMD) that includes an integrated display (e.g., a built-in display) that displays a representation of the operating environment 200. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the representation of the operating environment 200. For example, in some implementations, the electronic device 210 corresponds to a mobile phone that can be attached to the head-mountable enclosure. In various implementations, examples of the electronic device 210 include smartphones, tablets, media players, laptops, etc.

The electronic device 210 includes a display 212. The display 212 provides a viewable region 214 including a portion the operating environment 200. The portion the operating environment 200 includes a wall 216, a ceiling 218, and a painting 220 on the wall 216. The painting 220 includes a cloud 222, raindrops 224, and a person holding an umbrella 226. In some implementations, one or more of the wall 216, the ceiling 218, and the painting 220) correspond to respective physical objects. For example, the viewable region 214 includes a physical painting 220 hanging on a physical wall 216. In some implementations, one or more of the wall 216, the ceiling 218, and the painting 220 correspond to respective computer-generated objects. For example, in some implementations, the painting 220 is a computer-generated (e.g., static) image 220, and the electronic device displays, on the display 212, the computer-generated image 220 overlaid on a physical wall 216.

Figure 2B:
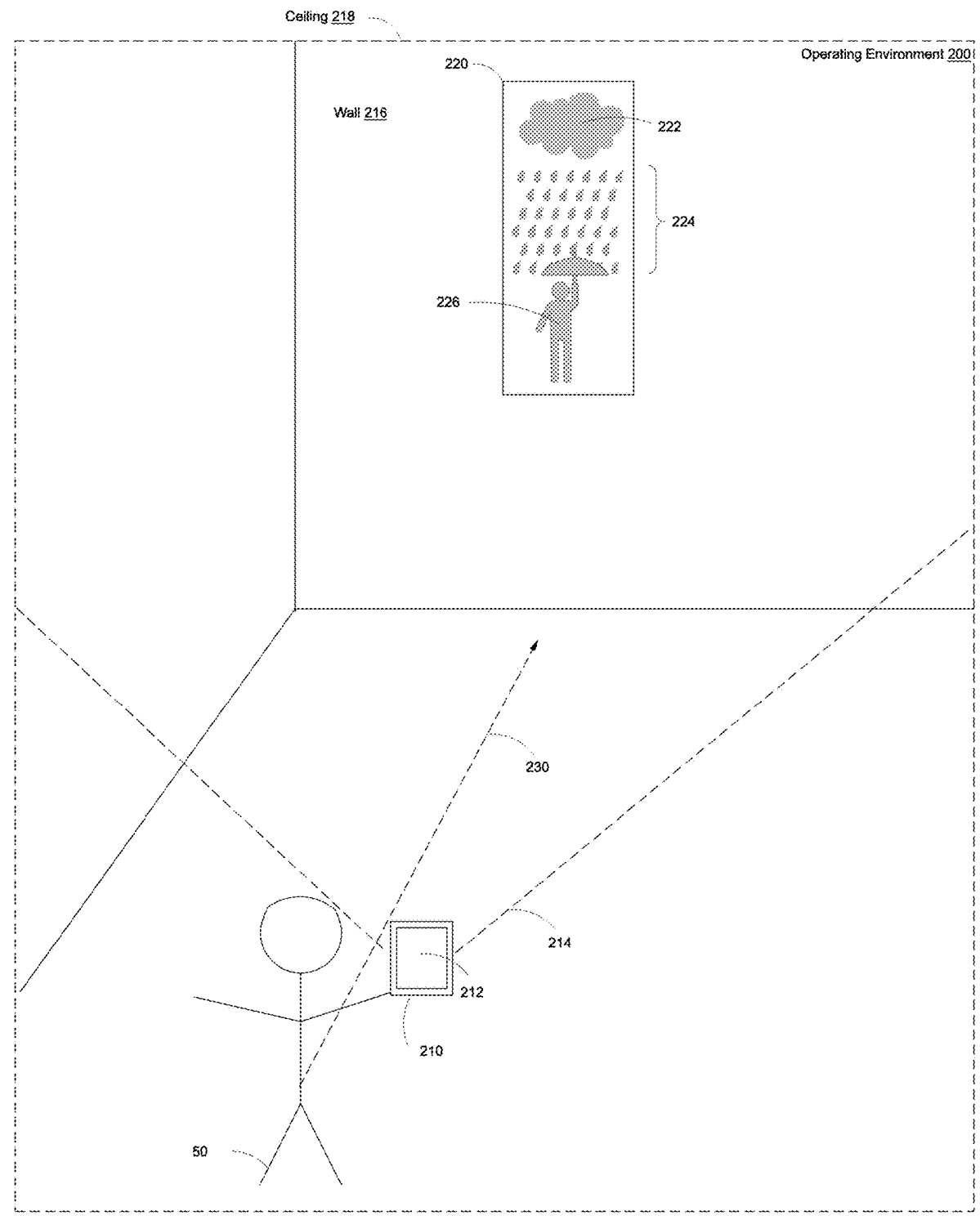
Figure 2C:
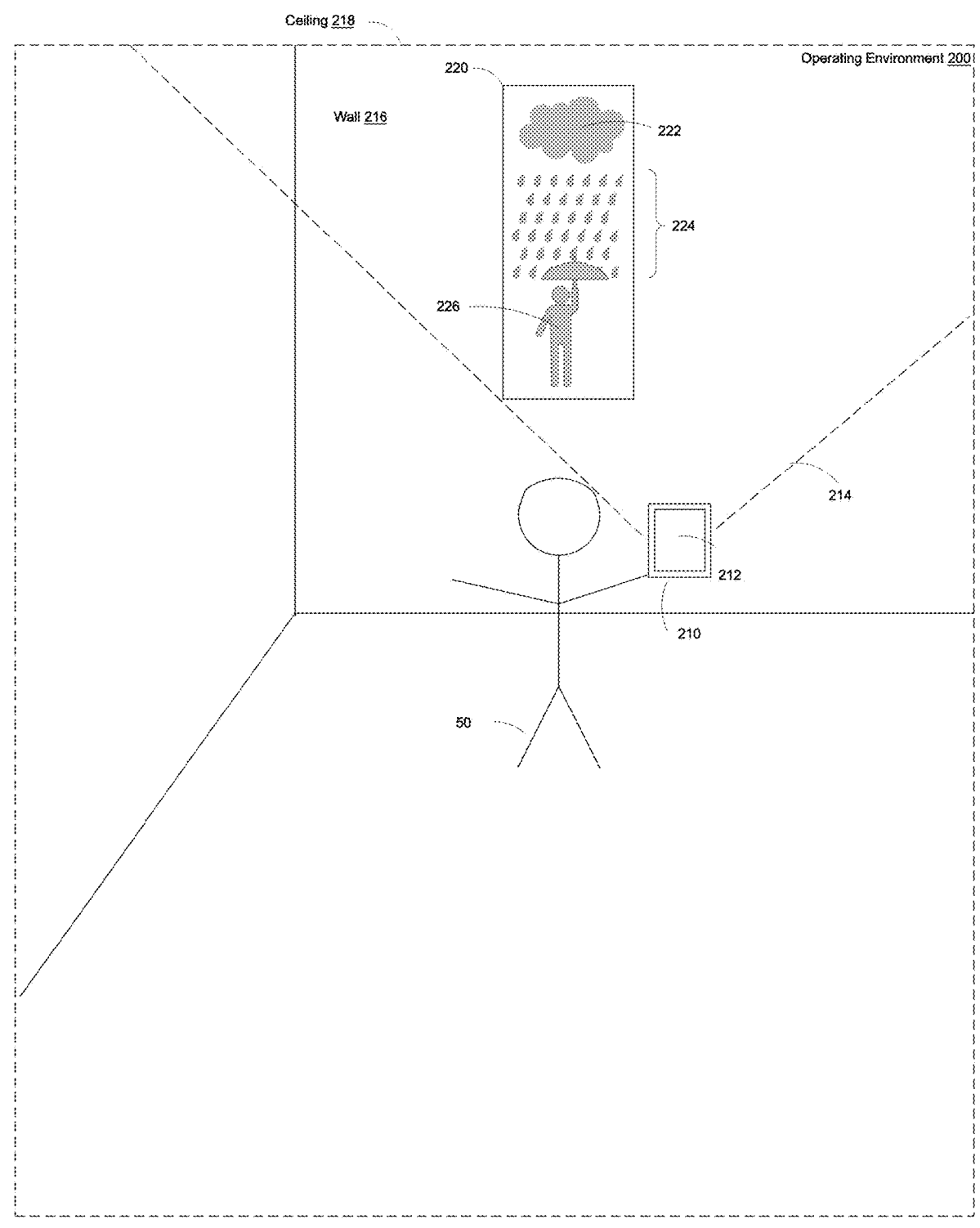
Figure 2D:
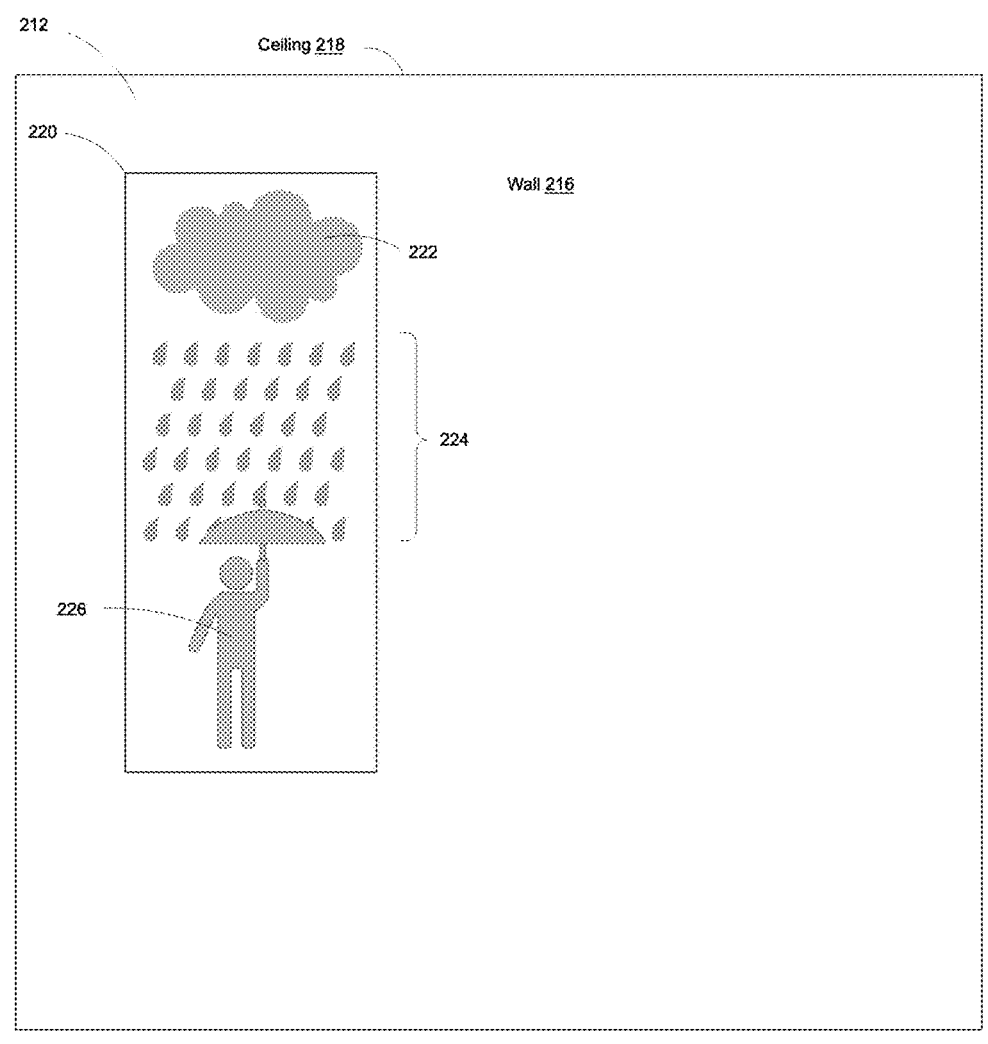

As illustrated in FIG. 2B, the user 50, while holding the electronic device 210, walks towards the wall 216, as is indicated by movement line 230. The movement line 230 is illustrated for purely explanatory purposes. Accordingly, as illustrated in FIG. 2C, the user 50 and the electronic device 210 are closer to the wall 216. As illustrated in FIG. 2D, the display 212 of the electronic device 210 includes the wall 216, the ceiling 218, and the painting 220.

The electronic device 210 determines an engagement score associated with an object that is visible at the display 212. The engagement score characterizes a level of user engagement with respect to the object. According to various implementations, the electronic device 210 includes a tracker that outputs tracking data associated with the user 50. In some implementations, the tracker includes a combination of an eye tracking sensor (e.g., the eye tracking sensor 164 in FIG. 1) and an extremity tracking sensor (e.g., the extremity tracking sensor 150 in FIG. 1).

Figure 2E:
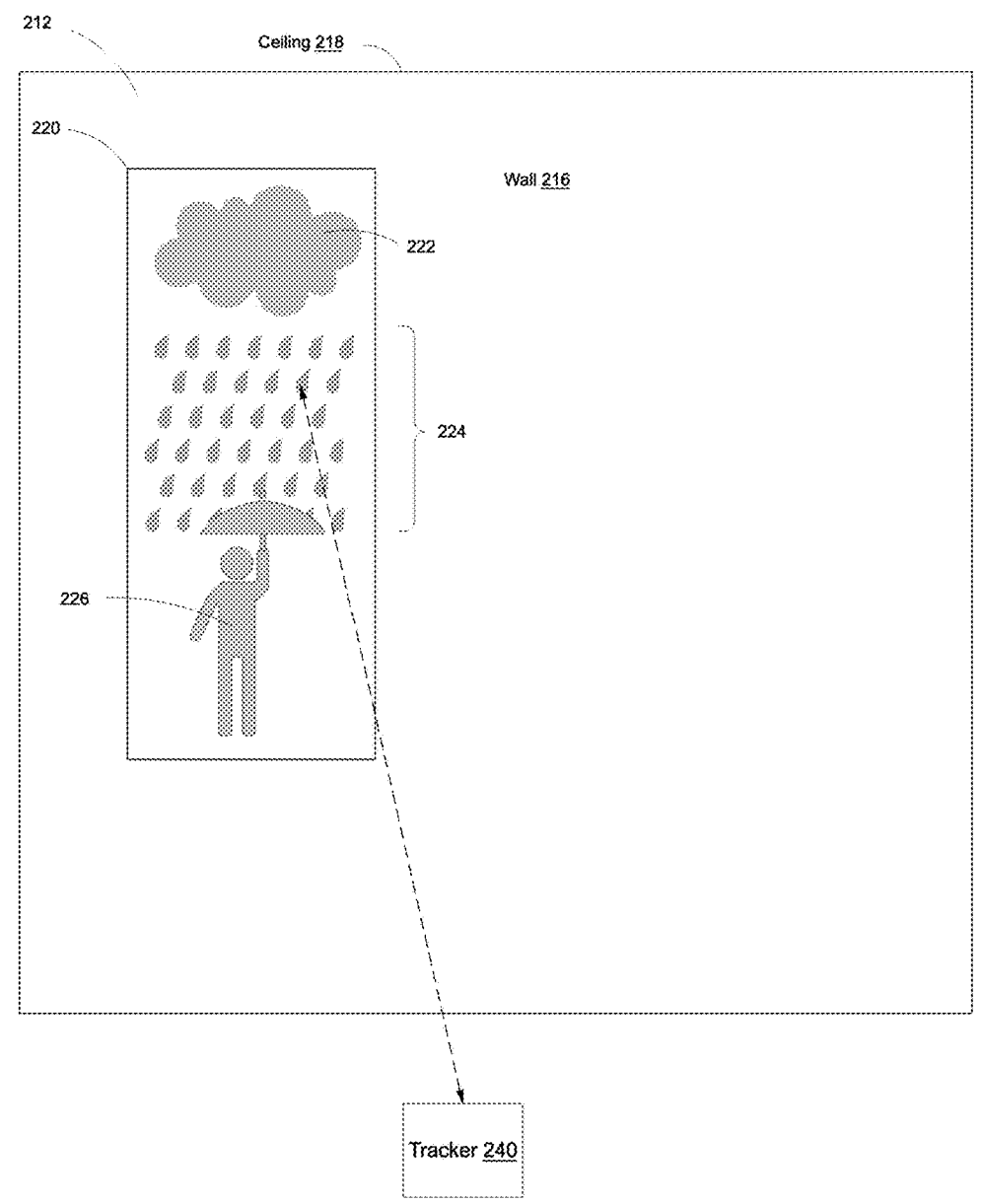
Figure 2F:
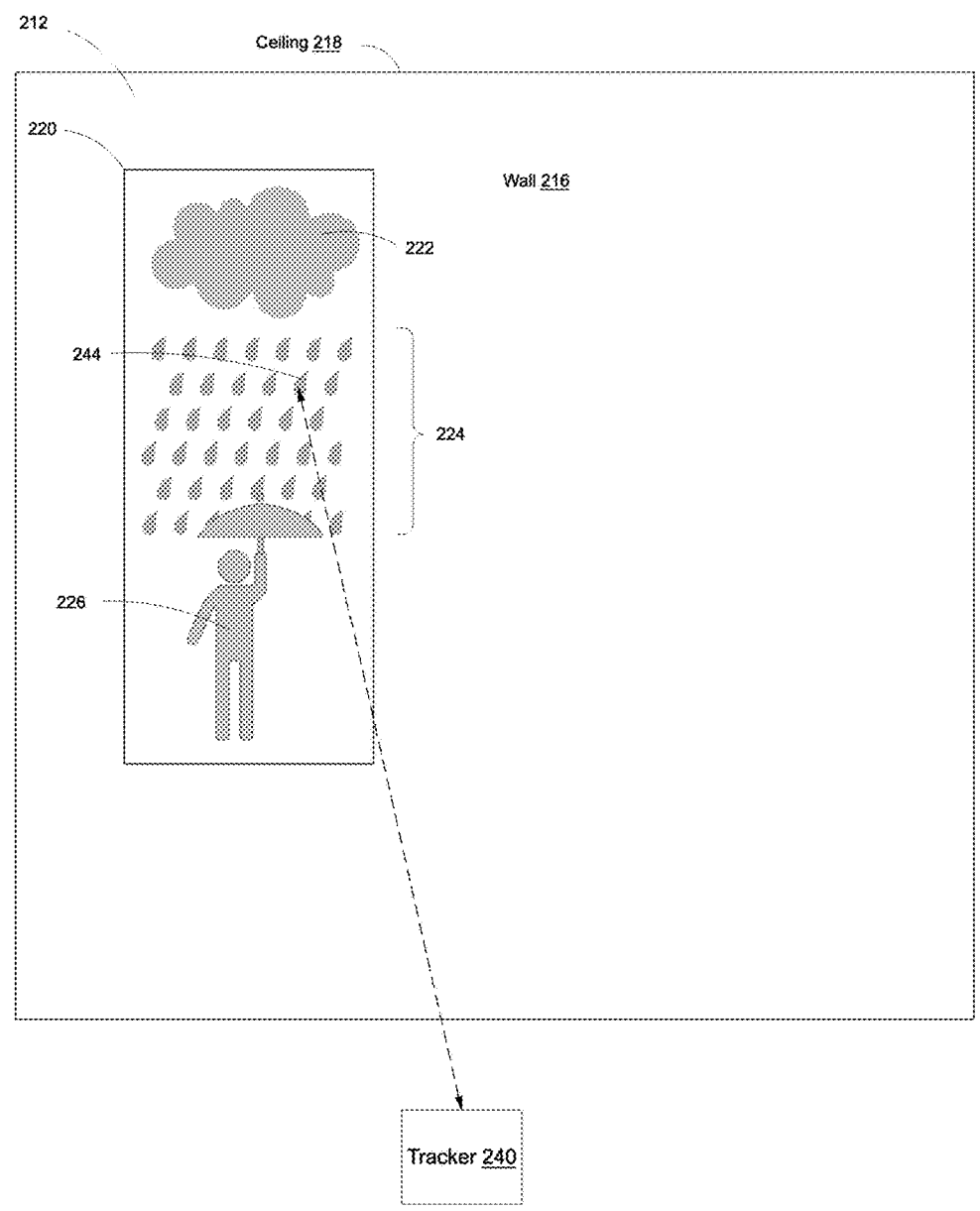

For example, as illustrated in FIG. 2E, a tracker 240 outputs tracking data associated with the user 50. The tracking data indicates that the user 50 is engaging with (e.g., focused on) a particular raindrop 244 of the raindrops 224, as illustrated in FIG. 2F. For example, the tracking data indicates that the user 50 is gazing at the particular raindrop 244. As another example, the tracking data indicates that an extremity (e.g., a finger) of user 50 is located at a position that corresponds to (e.g., is within a threshold distance from) a position of the particular raindrop 244. In some implementations in which the painting 220 is a physical (e.g., real-world) painting, the electronic device 210 obtains one or more semantic values associated with the physical painting, such as "raindrop," "cloud," "umbrella," etc.

Moreover, the electronic device 210 determines an engagement score associated with the particular raindrop 244. In some implementations, the engagement score is a function of a temporal characteristic associated with the user engagement. For example, the engagement score is proportional to the amount of time the user 50 engages with the particular raindrop 244. In some implementations, the electronic device 210 determines an ambience vector based on a function of the engagement score and the object, as will be described below.

Figure 2G:
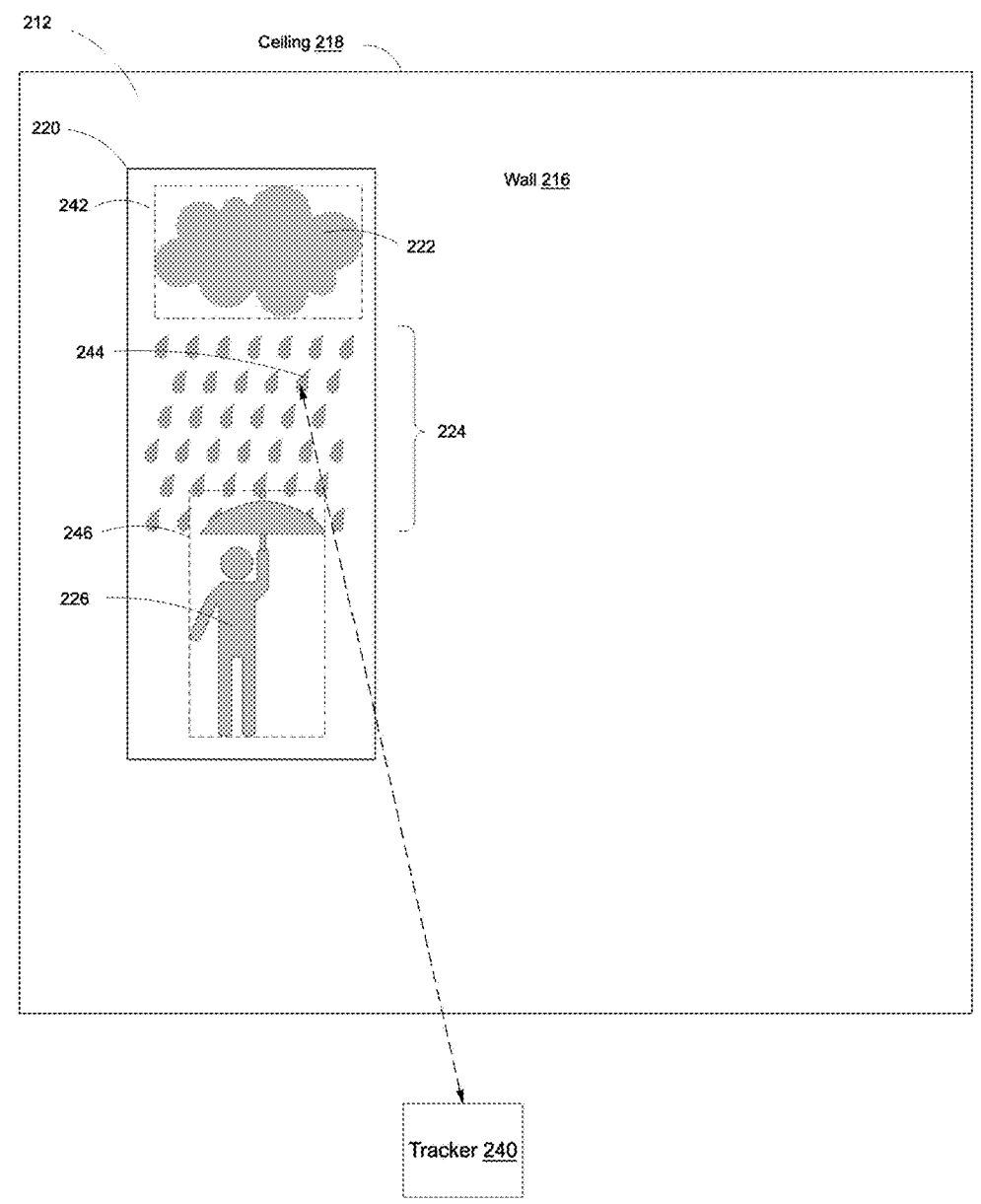

In some implementations, in addition to identifying the object, the electronic device 210 identifies additional objects and determines the ambience vector based on the additional objects. For example, in some implementations, the electronic device 210 identifies additional objects that satisfy a proximity threshold with respect to the object. As another example, in some implementations, the electronic device 210 identifies additional objects that are within a boundary also shared by the object. For example, as illustrated in FIG. 2G, the electronic device 210 identifies the cloud 222 and the person holding the umbrella 226 (respectively indicated by bounding boxes 242 and 246) because of their proximity to the particular raindrop 244. Alternatively, in some implementations, the electronic device 210 identifies the cloud 222 and the person holding the umbrella 226 because they are included within the outline of the painting 220 that also includes the particular raindrop 244.

In response to determining that the engagement score satisfies an engagement criterion, the electronic device 210 determines an ambience vector associated with the object and presents content based on the ambience vector. The ambience vector represents a target ambient environment. In some implementations, the engagement score satisfies the engagement criterion when the engagement score is indicative of a level of user engagement that satisfies a temporal threshold, such as eye gaze data indicating a gaze of an eye is directed to the object for more than two seconds. In some implementations, the engagement score satisfies the engagement criterion when the engagement score is indicative of user engagement with respect to an object of a predetermined object type. For example, the engagement score satisfies the engagement criterion when extremity tracking data indicates that a finger of the user 50 spatially corresponds to a picture hanging on a blank wall, but not when the finger spatially corresponds to the blank wall itself. Accordingly, by selectively determining an ambience vector and presenting content, the electronic device 210 reduces resource utilization.

Figure 2H:
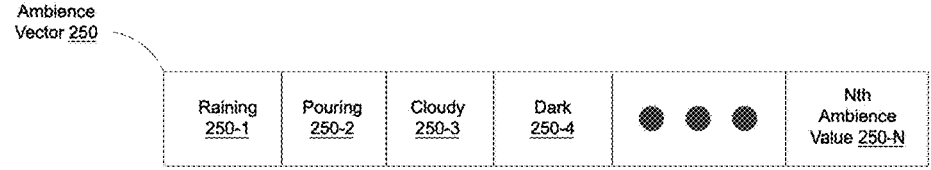

For example, as illustrated in FIG. 2H, the electronic device 210) determines an ambience vector 250 associated with particular raindrop 224. In some implementations, the electronic device 210 determines the ambience vector 250 based on a function of the particular raindrop 224, and optionally further based on a function of additional content (e.g., the cloud 222 and the person holding the umbrella 226). To these ends, in some implementations, the ambience vector 250 includes a first ambience value 250-1 of "Raining" because of the particular raindrop 244. The ambience vector 250 includes a second ambience value 250-2 of "Pouring" (e.g., heavy rainfall) because of the particular raindrop 244 and because, based on the person holding the umbrella 226, the electronic device 210 determines (e.g., infers) that the level of rainfall is relatively high so as to necessitate the use of an umbrella. The electronic device 210 determines a third ambience value 250-3 of "Cloudy." and a fourth ambience value 250-4 of "Dark" based on the cloud 222, wherein the determination may be independent of, or with consideration of, the particular raindrop 244. One of ordinary skill in the art will appreciate that the ambience vector 250 may include any number of ambience values 250-1-250-N, such as more or fewer than four ambient values.

Figure 2I:
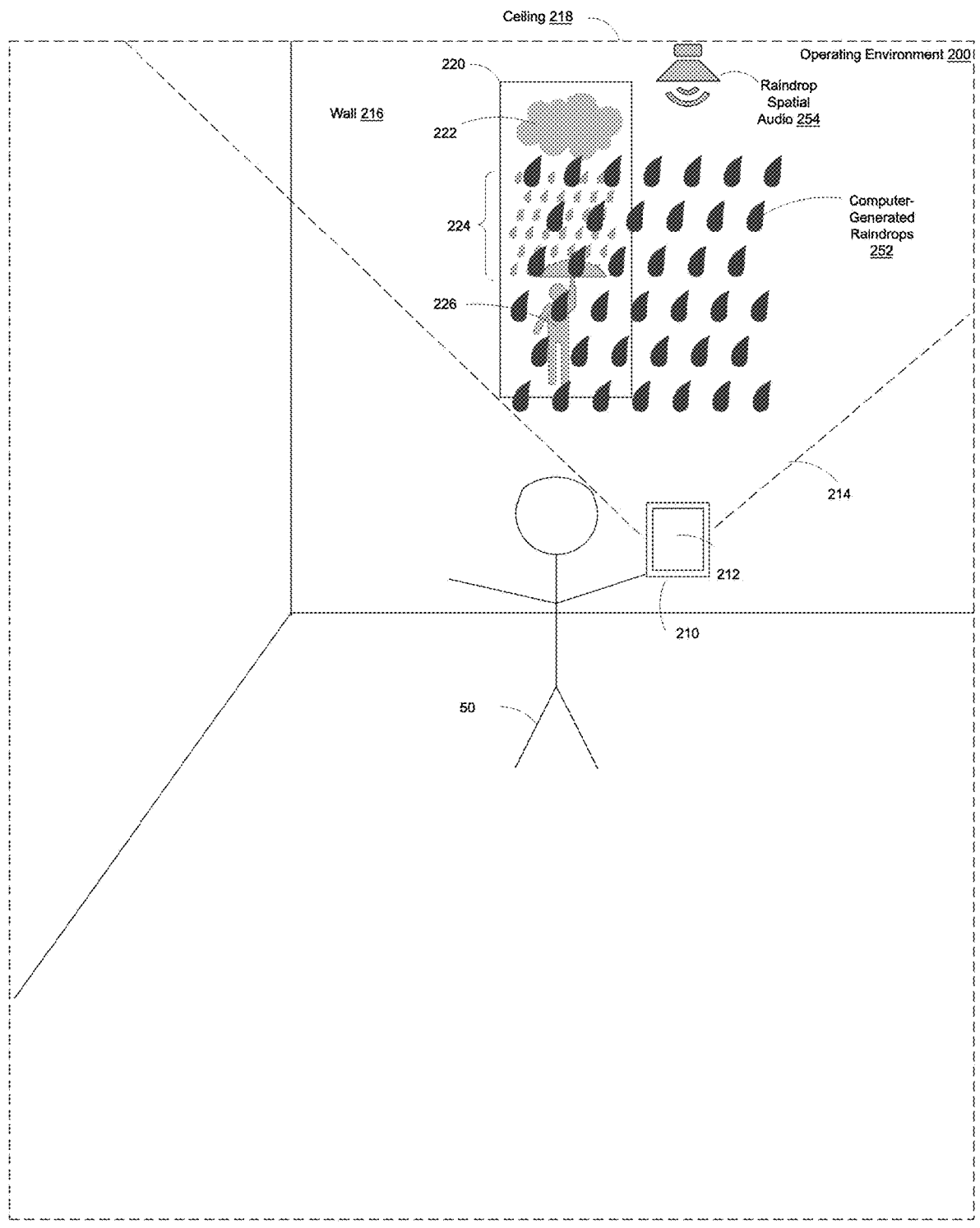

As illustrated in FIG. 2I, based on the ambience vector 250, the electronic device 210 presents various content. For example, the electronic device 210 displays, on the display 212, computer-generated raindrops 252 because of the first ambience value 250-1 of "Raining" and/or the second ambience value 250-2 of "Pouring." As another example, the electronic device 210 plays (e.g., via an integrated speaker), spatial audio of raindrops that sound as though the raindrops are hitting the ceiling 218 of the operating environment 200, as is indicated by the sound icon 254. Accordingly, the sound icon 254 is illustrated as being near the ceiling 218. The sound icon 254 is illustrated for purely explanatory purposes.

In some implementations, based on a function of the ambience vector 250, the electronic device 210 transmits instructions to a secondary device in order to drive an operation of the secondary device. For example, based on the fourth ambience value 250-4 of "Dark," the electronic device 210 transmits to a smart home system, an instruction that is a function of the fourth ambience value 250-4. For example, the smart home system is operable to control characteristics of the operating environment 200. Continuing with this example, the corresponding instruction instructs the smart home system to dim the lights in order to make the ambience of the operating environment 200 darker.

In some implementations where the electronic device 210 includes a HMD, the electronic device 210 can itself adjust the appearance of operating environment 200 based on the ambience vector 250. For example, electronic device 210 can display video representing the operating environment 200 based on corresponding video data received from one or more outward facing cameras. Based on the fourth ambience value 250-4 of "Dark," the electronic device 210 can dim the video in order to make the ambience of the operating environment 200 appear darker.

Figure 3A:
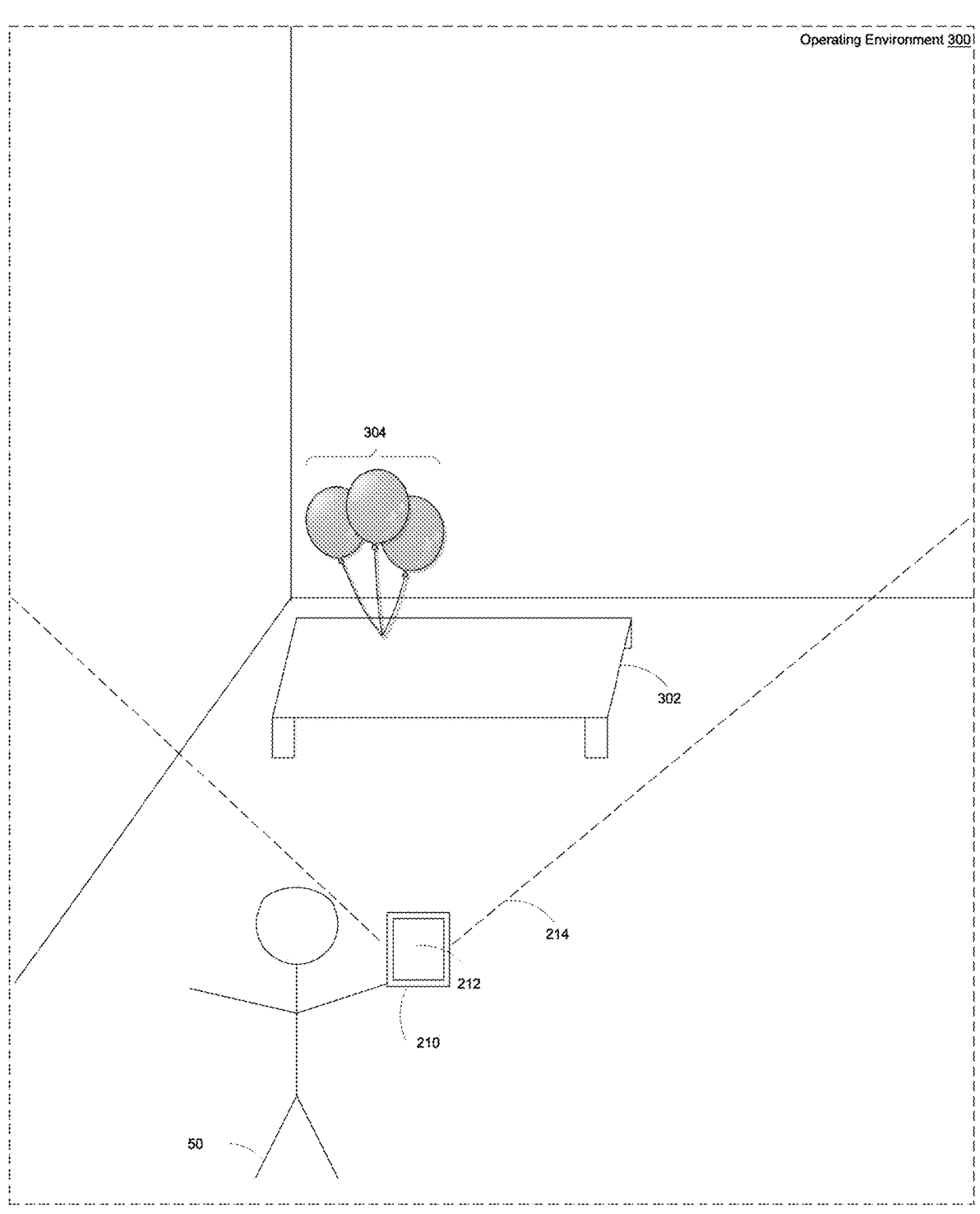

FIGS. 3A-3H are examples of presenting anchored content based on an ambience vector in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As illustrated in FIG. 3A, the electronic device 210 is associated with an operating environment 300. In some implementations, the operating environment 300 is similar to the operating environment 200 illustrated in FIGS. 2A-2I.

As illustrated in FIG. 3A, the viewable region 214 of the display 212 includes balloons 304 resting atop of a table 302. In some implementations, one or both of the table 302 and the balloons 304 correspond to a physical object. In some implementations, one or both of the table 302 and the balloons 304 correspond to a computer-generated object.

Figure 3B:
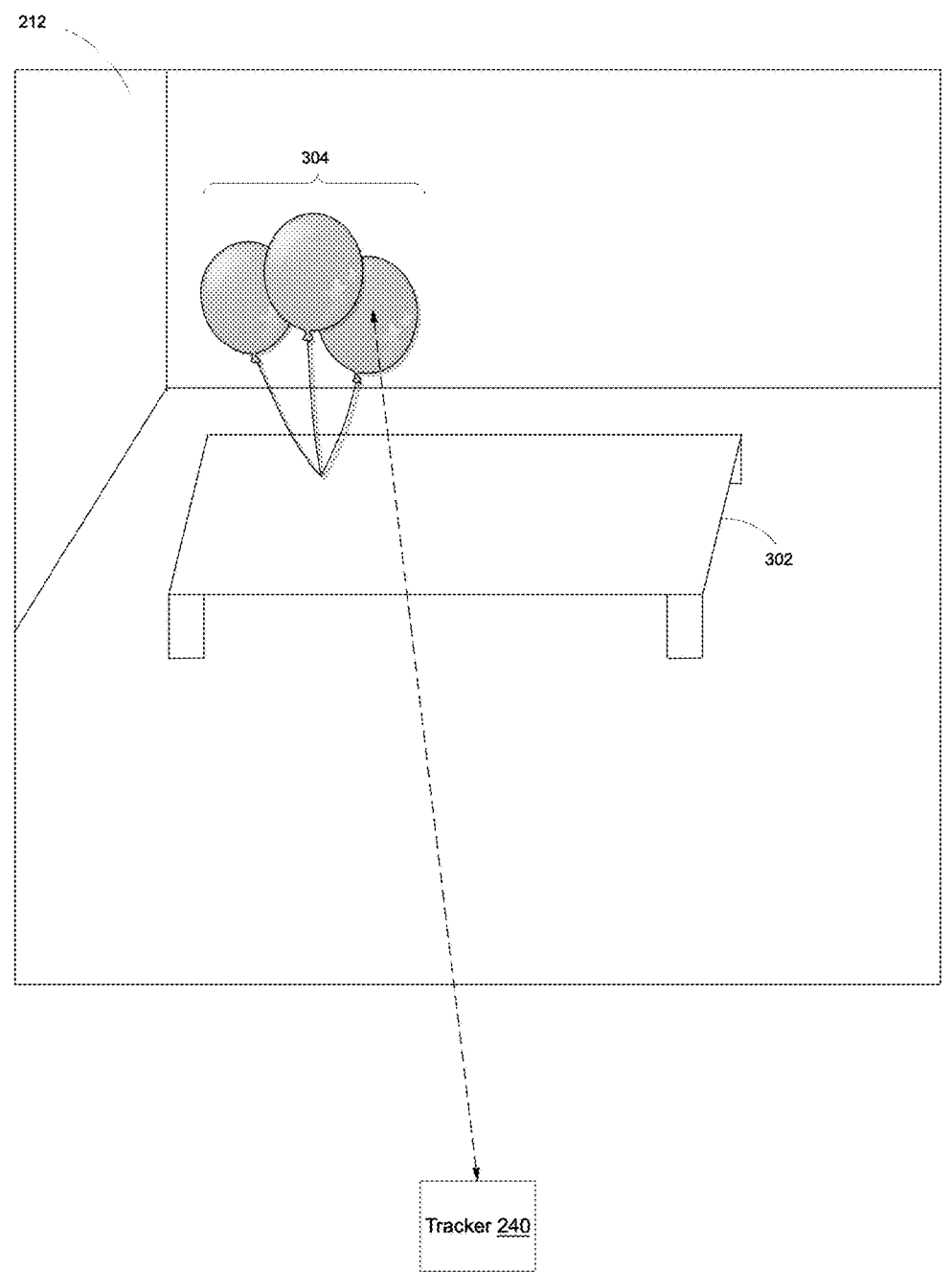
Figure 3C:
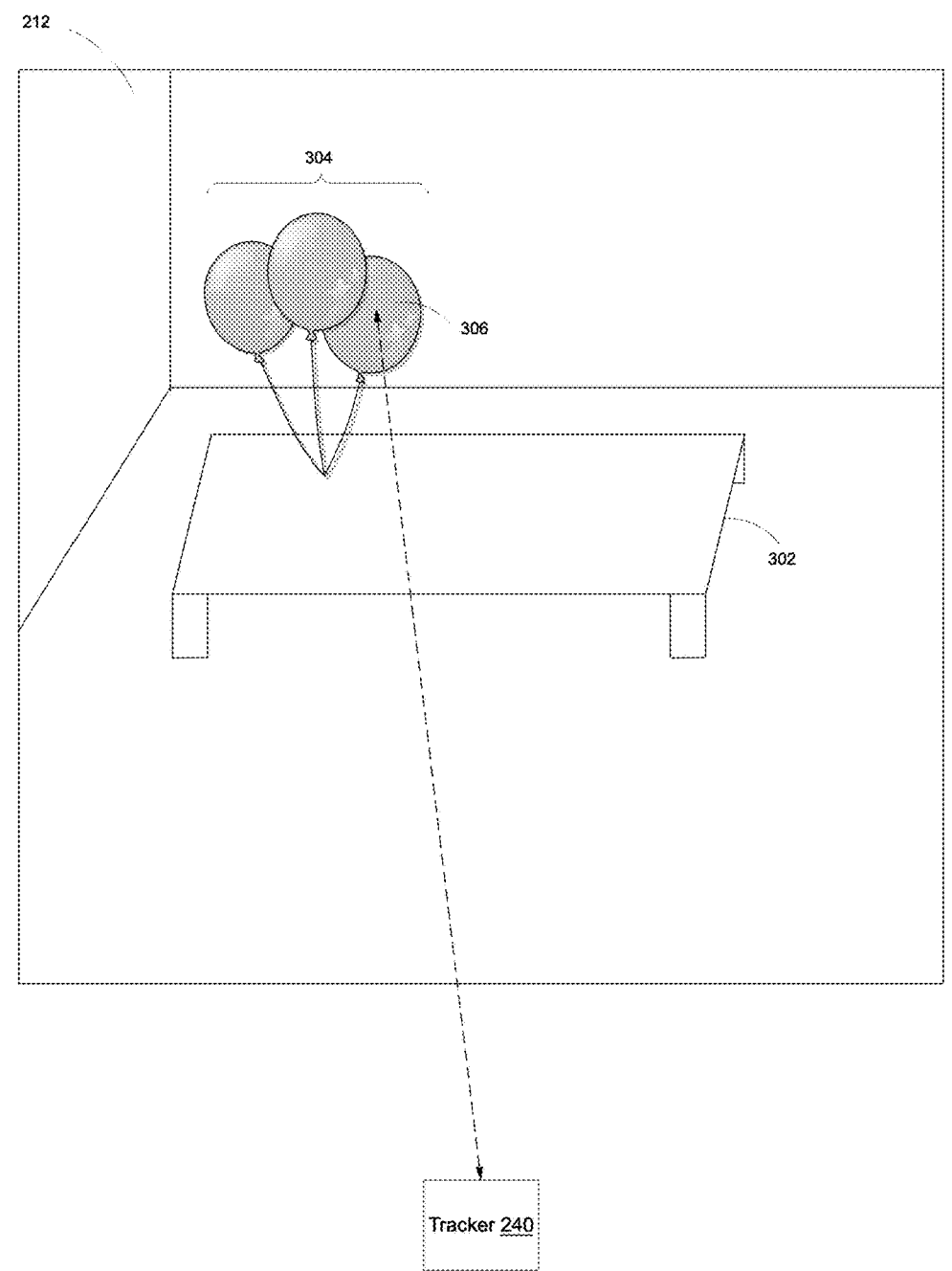

As illustrated in FIG. 3B, the display 212 displays table 302 and the balloons 304. Moreover, as was described with reference to FIG. 2E, the electronic device 210 includes the tracker 240 that implements one or more tracking functions (e.g., eye tracking function, extremity tracking function, etc.) associated with the user 50. Accordingly, as illustrated in FIG. 3C, the electronic device identifies a particular balloon 306 of the balloons 304 based on the one or more tracking functions. For example, the tracker 240 provides extremity tracking data associated with the user 50 to the electronic device 210, which, in turn, identifies the particular balloon 306. Moreover, the electronic device 210 determines an engagement score associated with the particular balloon 306.

Figure 3D:
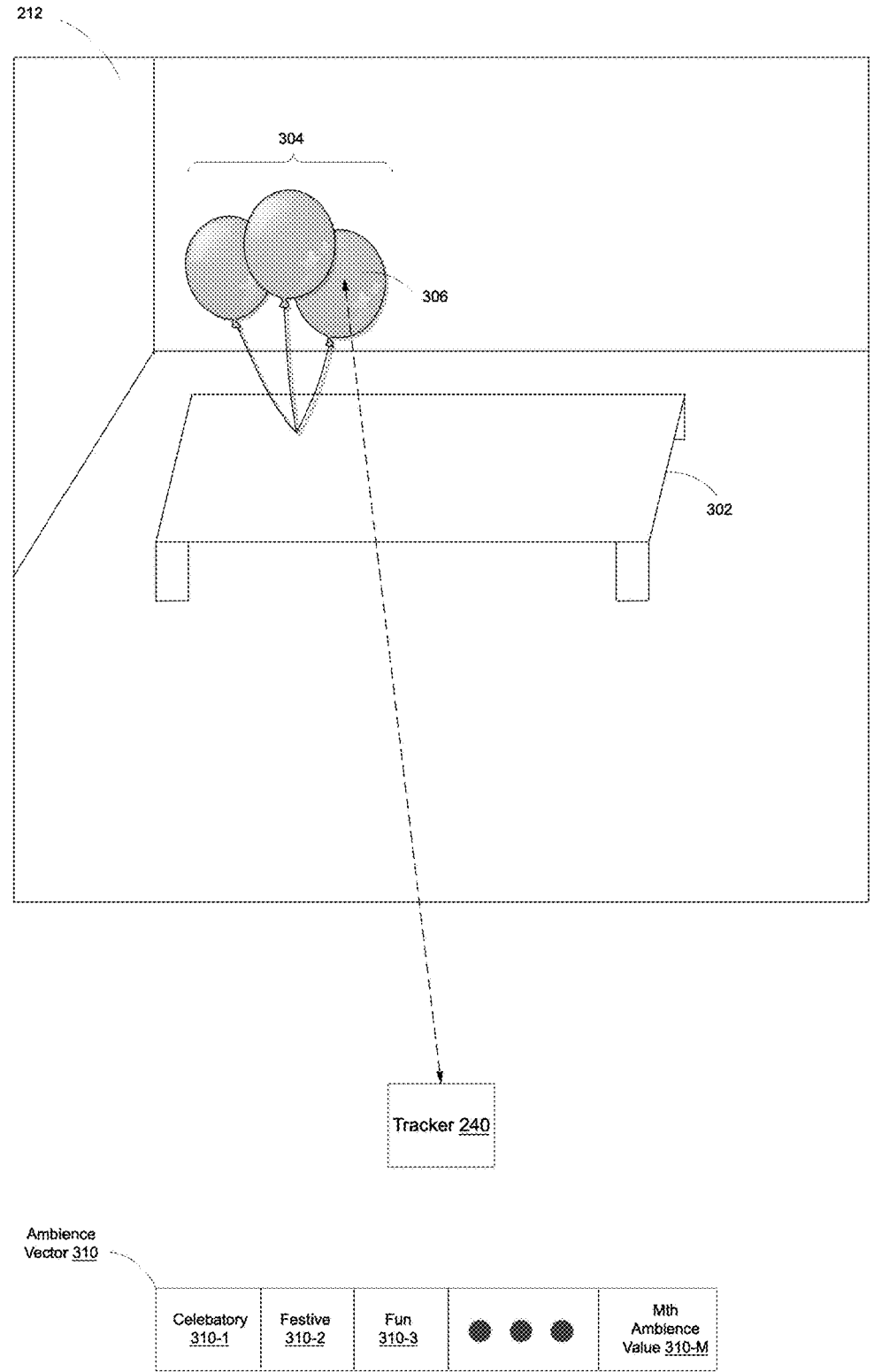

In response to determining that the engagement score satisfies an engagement criterion, the electronic device 210 determines an ambience vector 310 associated with the particular balloon 306, as illustrated in FIG. 3D. For example, based on extremity tracking data from the tracker 240, the electronic device 210 determines that a finger of the user 50 is placed within or proximate to the particular balloon 306 for more than a threshold amount of time. The ambience vector 310 includes a first ambience value 310-1 of "Celebratory," a second ambience value 310-2 of "Festive," and a third ambience value 310-3 of "Fun," because these ambiences are often associated with a balloon.

In some implementations, the electronic device 210 presents anchored content that is a function of the ambience vector, as is illustrated in FIGS. 3E-3H. As will be described, in some implementations, the anchored content is spatially aligned to a portion of the operating environment 300.

As illustrated in FIG. 3E, the electronic device 210 obtains a first image 320, a second image 330, and a third image 340. In some implementations, the electronic device 210 obtains the three images 320, 330, and 340 from local memory. For example, an image sensor integrated in the electronic device 210 previously captured one or more of the three images 320, 330, and 340. As another example, the electronic device 210 obtains one or more of the three images 320, 330, and 340 from another system, such as from the Internet or from another device (e.g., from a smartphone used by a family member of the user 50).

The first image 320 includes the table 302 that is currently within the viewable region 214 of the display (See FIG. 3A). The first image 320 also includes an individual 324. Notably, the individual 324 appears to be sad because of the sad face of the individual 324. Accordingly, in some implementations, the electronic device 210 determines, based on the sad appearance of the individual 324, that the first image 320 does not satisfy a similarity threshold with respect to the ambience vector 310. Namely, a sad appearance is not typically associated with the ambience values of "Celebratory," "Festive," and "Fun" included in the ambience vector 310. Thus, the electric device 210 foregoes spatially aligning the individual 324 with the table 302 on the display 212.

The second image 330 includes a party hat 334 sitting atop of a credenza 332. The electronic device 210 determines that the party hat 334 satisfies a similarity threshold with respect to the ambience vector 310, because the party hat 334 is generally associated with "Celebratory," "Festive," and "Fun" ambiences. However, because the second image 330 does not include the table 302 that is currently within the viewable region 214, the electronic device 210 foregoes spatially aligning the party hat 334 with the table 302 on the display 212. By foregoing spatially aligning certain content (e.g., the first image 320 and the second image 330), the electronic device 210 utilizes less resources.

The third image 340 includes the table 302 and a birthday cake 344. The electronic device 210 determines that the birthday cake 344 satisfies a similarity threshold with respect to the ambience vector 310, because the birthday cake 344 is typically associated with "Celebratory," "Festive," and "Fun" ambiences. Moreover, the third image 340 includes the table 302 that is within the current viewable region 214 of the display 212. Accordingly, the electronic device 210 spatially aligns the birthday cake 344 to the table 302, as is illustrated in FIGS. 3F-3H.

Figure 3F:
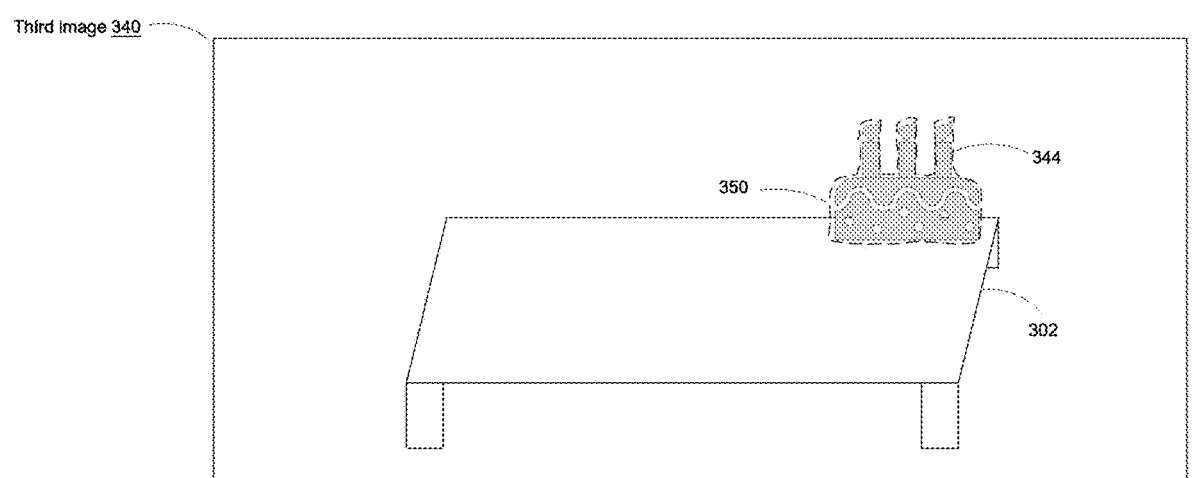

As illustrated in FIG. 3F, the electronic device 210 determines a location of the birthday cake 344 within the third image 340, as indicated by a bounding outline 350. The bounding outline 350 is illustrated for purely explanatory purposes. For example, the electronic device 210 determines that spatial location of the birthday cake 344 relative to the table 302, such as being located atop of the table 302 and near the upper-right corner of the table 302.

Figure 3G:
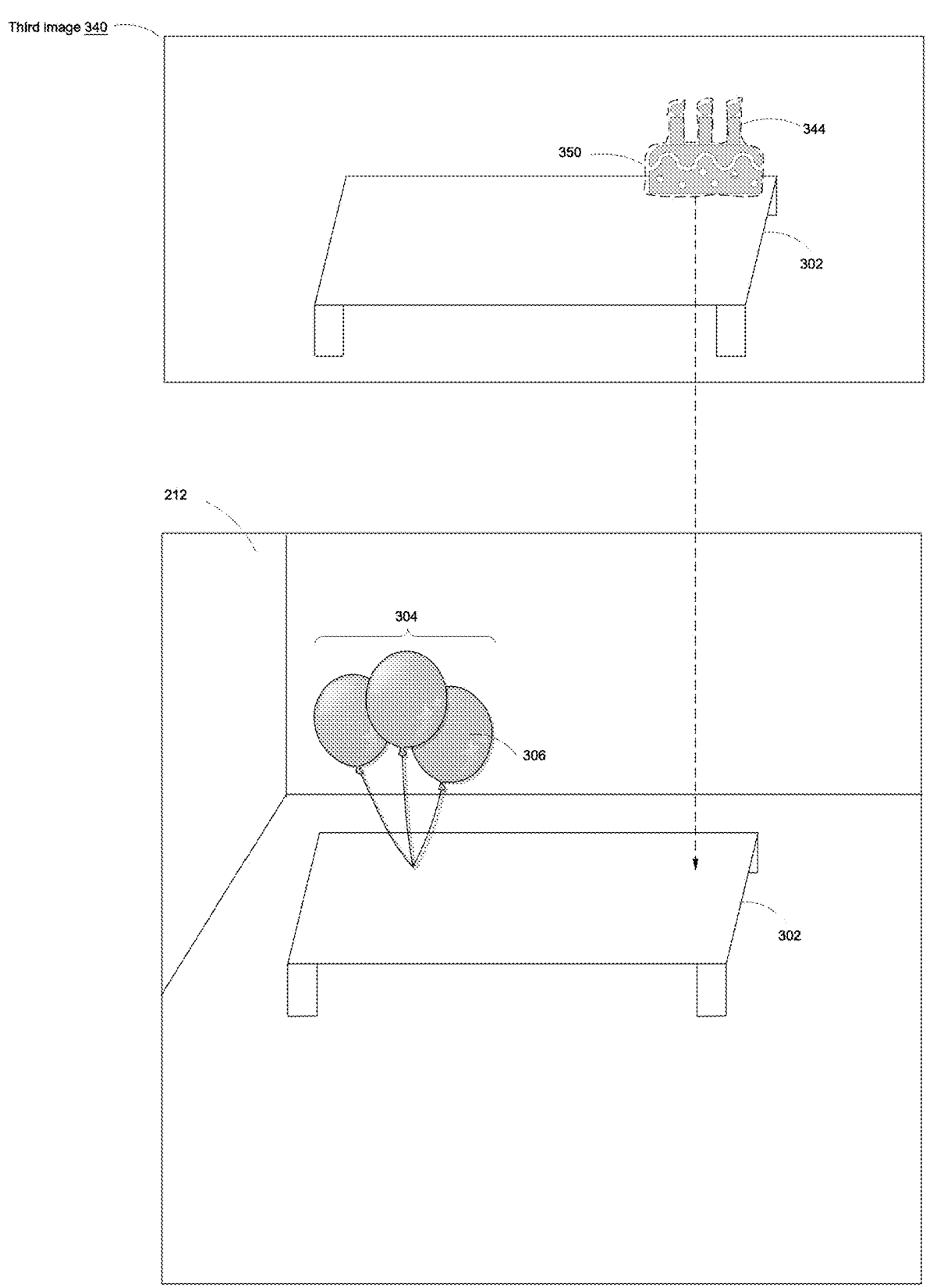
Figure 3H:
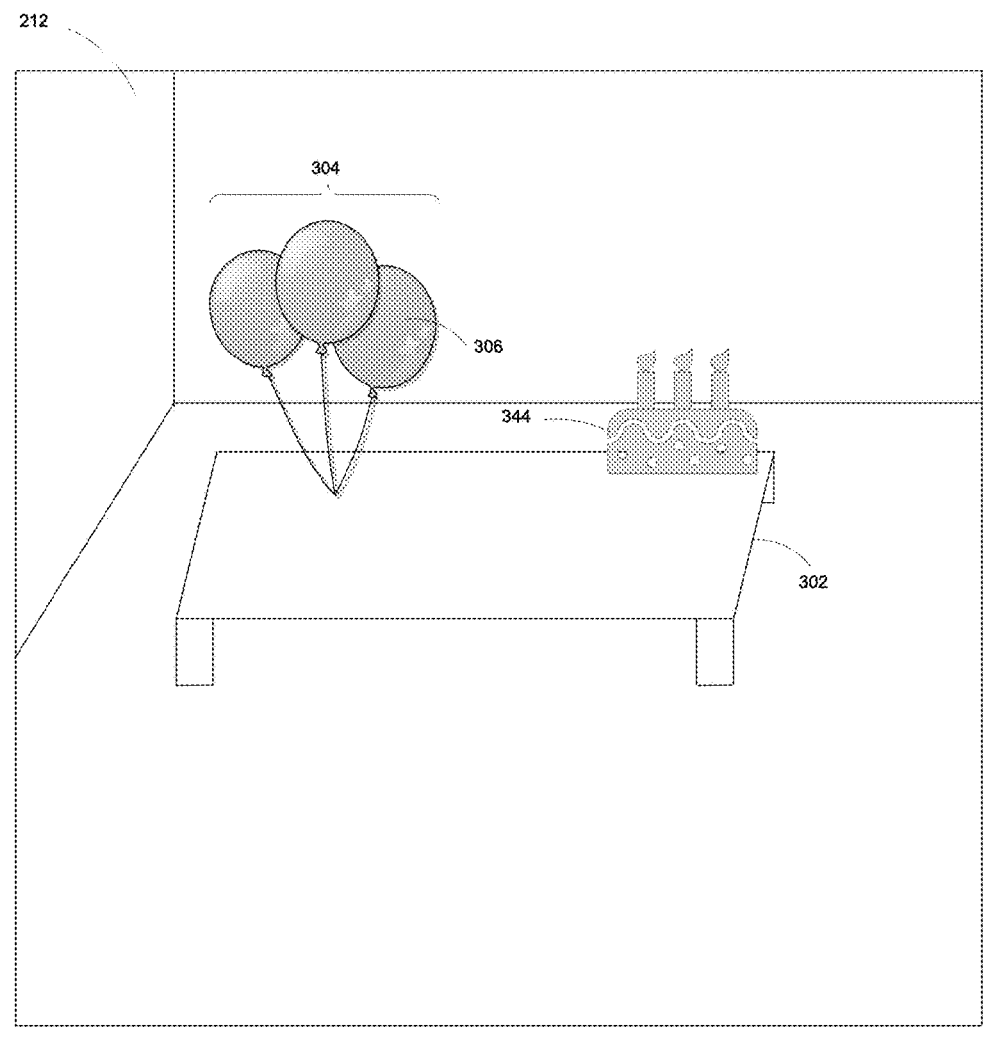

As illustrated in FIG. 3G, the electronic device 210 adds the birthday cake 344 to the display 212 in order to spatially align the birthday cake 344 to the table 302. For example, with reference to the third image 340, the birthday cake 344 is located at a first location on the table 302. Continuing with this example, the electronic device 210 adds, to the display 212, the birthday cake 344 at a second location relative to the table 302 that satisfies a similarity threshold with respect to the first location. As illustrated in FIG. 3H, the electronic device 210 displays, on the display 212, the birthday cake 344 spatially aligned to the table 302.

One of ordinary skill in the art will appreciate that, in some implementations, the electronic device 210 spatially aligns other kinds of content, such as audio content or video content. For example, the electronic device 210 spatially aligns, to the table 302, an anchored video stream that represents a group of children playing around the table 302.

Figure 4:
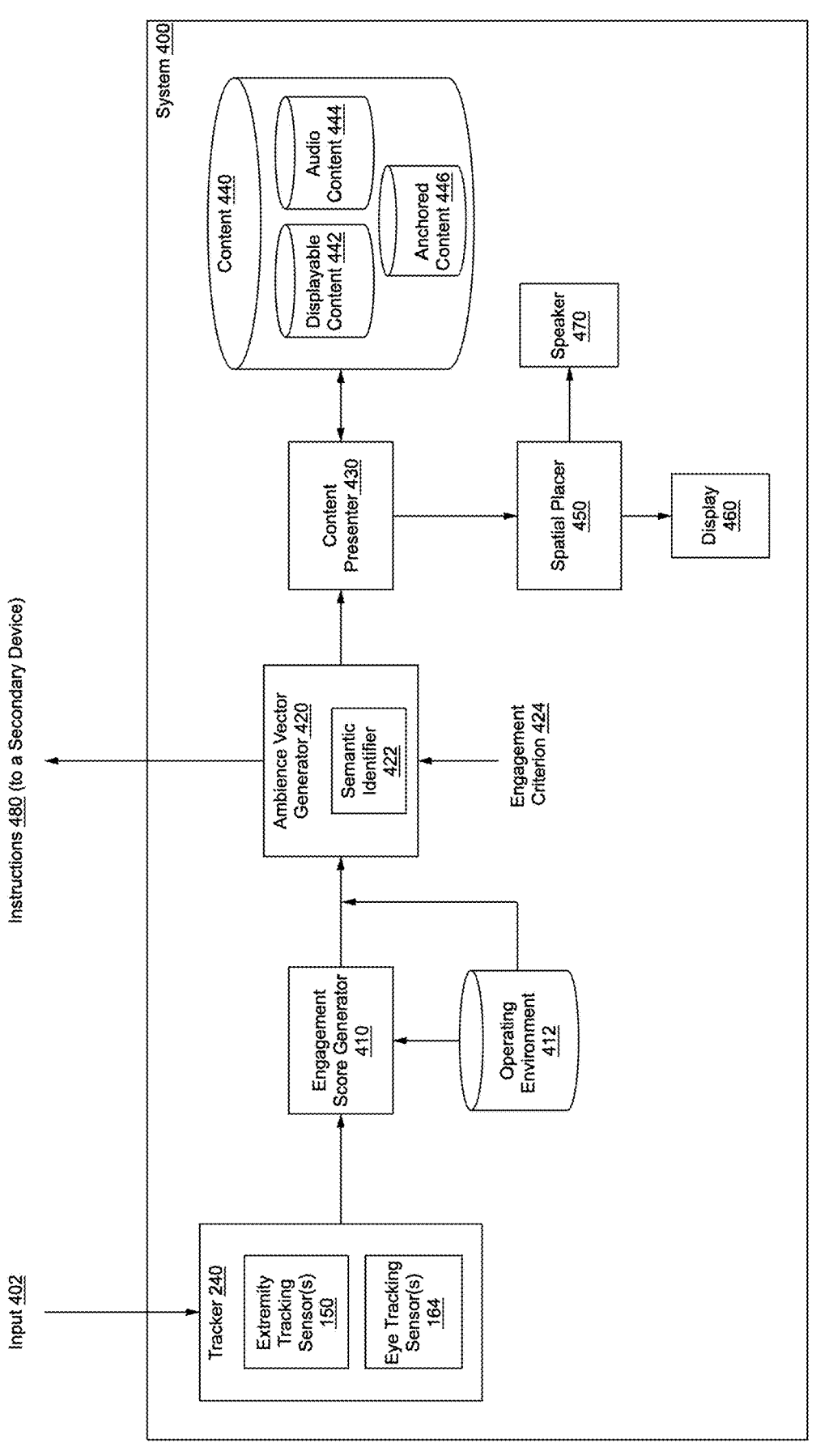
FIG. 4 is an example of a block diagram of a system for presenting content based on an ambience vector in accordance with some implementations.

FIG. 4 is an example of a block diagram of a system 400 for presenting content based on an ambience vector in accordance with some implementations. In various implementations, the system 400 or portions thereof are included in an electronic device (e.g., the electronic device 100 in FIG. 1 or the electronic device 210 in FIGS. 2A-2I or FIGS. 3A-3H). In various implementations, the system 400 or portions thereof are included in a head-mountable device (HMD). In some implementations, the system 400 includes processing logic, including hardware, firmware, software, or a combination thereof. In some implementations, the system 400 includes a processor executing code stored in a non-transitory computer-readable medium (e.g., a memory).

The system 400 includes an engagement score generator 410 that determines an engagement score associated with an object visible at a display 460. The engagement score characterizes a level of user engagement with respect to the object. The object is included within an operating environment (e.g., stored in an operating environment datastore 412), such as the operating environment 200 in FIGS. 2A-2I or the operating environment 300 in FIGS. 3A-3H. In some implementations, the operating environment includes computer-generated objects, and the engagement score generator 410) determines the engagement score associated with a particular one of the computer-generated objects. In some implementations, the operating environment includes a combination of physical objects and computer-generated objects, and the engagement score generator 410 determines the engagement score associated with a particular computer-generated object or a physical object. In some implementations, the operating environment is a purely physical environment including purely physical objects, and the engagement score generator 410 determines the engagement score associated with a particular physical object.

According to various implementations, the engagement score generator 410 determines the engagement score based on a function of tracking data from the tracker 240. The tracker is 240 is described with reference to FIGS. 2A-2I and FIGS. 3A-3H. In some implementations, the tracker 240 includes a combination of one or more extremity tracking sensors 150 and one or more eye tracking sensors 164. For example, with reference to FIGS. 2E, 2F, and 4, the extremity tracking sensor(s) 150 receive an input 402, and based on the input 402, outputs extremity tracking data indicating that an extremity of the user 50 is engaging with the particular raindrop 244. Continuing with this example, the engagement score generator 410 generates, based on the extremity tracking data, an engagement score that characterizes a level of user engagement with respect to the particular raindrop 244. As another example, with reference to FIGS. 3B, 3C, and 4, the eye tracking sensor(s) 164 receive an input 402 and based on the input 402, outputs eye tracking data indicating that an eye gaze of the user 50 is focused on the particular balloon 306. Continuing with this example, the engagement score generator 410 generates, based on the eye tracking data, an engagement score that characterizes a level of user engagement with respect to the particular balloon 306. As another example, based on tracking data indicative of selection of a particular photo from a photo album, an electronic device selects the particular photo.

The system 400 includes an ambience vector generator 420. The ambience vector generator 420 receives data representative of the operating environment, such as image data and/or virtual object data (e.g., stored within the operating environment datastore 412) that represents the operating environment 200 or the operating environment 300. The ambience vector generator 420 determines an ambience vector based on the engagement score from the engagement score generator 410. The ambience vector represents a target ambient environment. To that end, in some implementations, the ambience vector generator 420) determines whether or not the engagement score satisfies an engagement criterion 424. In response to determining that the engagement score satisfies the engagement criterion 424, the ambience vector generator 420 determines an ambience vector associated with the object. For example, when the engagement score indicates focus on an object for more than a threshold amount of time, the ambience vector generator 420 determines that the engagement score satisfies the engagement criterion 424.

In some implementations, the ambience vector generator 420 includes a semantic identifier 422 that aids the ambience vector generator 420 in determining the ambience vector. For example, when the object is a physical object, the semantic identifier 422 obtains a semantic value associated with the object, such as obtaining a semantic value of "balloon" for the particular balloon 306 illustrated in FIG. 3C. Continuing with this example, the ambience vector generator 420 uses the "balloon" semantic value in order to determine an ambience vector 310 associated with "balloon," as is illustrated in FIG. 3D.

In response to determining that the engagement score satisfies the engagement criterion 424, a content presenter 430 of the system 300 presents content based on the ambience vector. To that end, in various implementations, the system 400 includes a combination of a content datastore 440, a spatial placer 450, a display 460, and a speaker 470 in order to facilitate presentation of the content. The content datastore 440 may include a variety of content, such as displayable content (e.g., stored in displayable content datastore 442), audio content (e.g., stored in audio content datastore 444), and anchored content (e.g., stored in anchored content datastore 446). For example, in some implementations, the content presenter 430 selects the displayable content and provides the displayable content for display on the display 460, such as is illustrated in display of the computer-generated raindrops 252 in FIG. 2I. As another example, in some implementations, the content presenter 430 selects the audio content and provides the audio content for playback via the speaker 470. In some implementations, the speaker 470 plays the audio content as spatial audio. For example, with reference to FIG. 2I, the electronic device 210 plays spatial audio of raindrops that sound as though they are hitting the ceiling 218.

In some implementations, the system 400 composites the displayable content with pass-through image data. For example, in some implementations, the system 400 includes an image sensor that obtains pass-through image data characterizing a physical environment, and the system 400 displays, on the display 460, the displayable content composited with the pass-through image data.

In some implementations, the display 460 corresponds to a see-through display that permits ambient light from a physical environment through the see-through display. For example, the see-through display is a translucent display, such as glasses with optical see-through. In some implementations, the see-through display is an additive display that enables optical see-through of the physical surface, such as an optical HMD (OHMD). For example, unlike purely compositing using pass-through image data, the additive display is capable of reflecting projected images off of the display while enabling the user to see through the display. In some implementations, the see-through display includes a photochromic lens. Thus, in some implementations, the system 400 adds the displayable content to the light from the physical environment that enters the see-through display.

In some implementations, the system 400 includes a spatial placer 450. The spatial placer 450 spatially aligns the anchored content within the operating environment. For example, with reference to FIGS. 3A-3H, the spatial placer 450 selects the third image 340 (and discards the first image 320 and third image 330) because the third image 340 includes the table 302 that is within the current viewable region 214 and includes the birthday cake 344 that matches the ambience vector 310 according to a similarity threshold. As another example, the spatial placer 450 spatially aligns audio content, such as playing a previously recorded "Happy Birthday" song based on the ambience vector 310 including a "Celebratory" ambience value 310-1.

In some implementations, the system 400 transmits instructions 480 to a secondary device in order to drive an operation of the secondary device. The instructions 480 are a function of the ambience vector. For example, the instructions 480 instruct a home lighting system to intensify the lights based on an ambience value of "bright." As another example, the instructions 480 instruct a home audio system to play a fast dance song based on an ambience value of "lively" or "upbeat."

Figure 5:
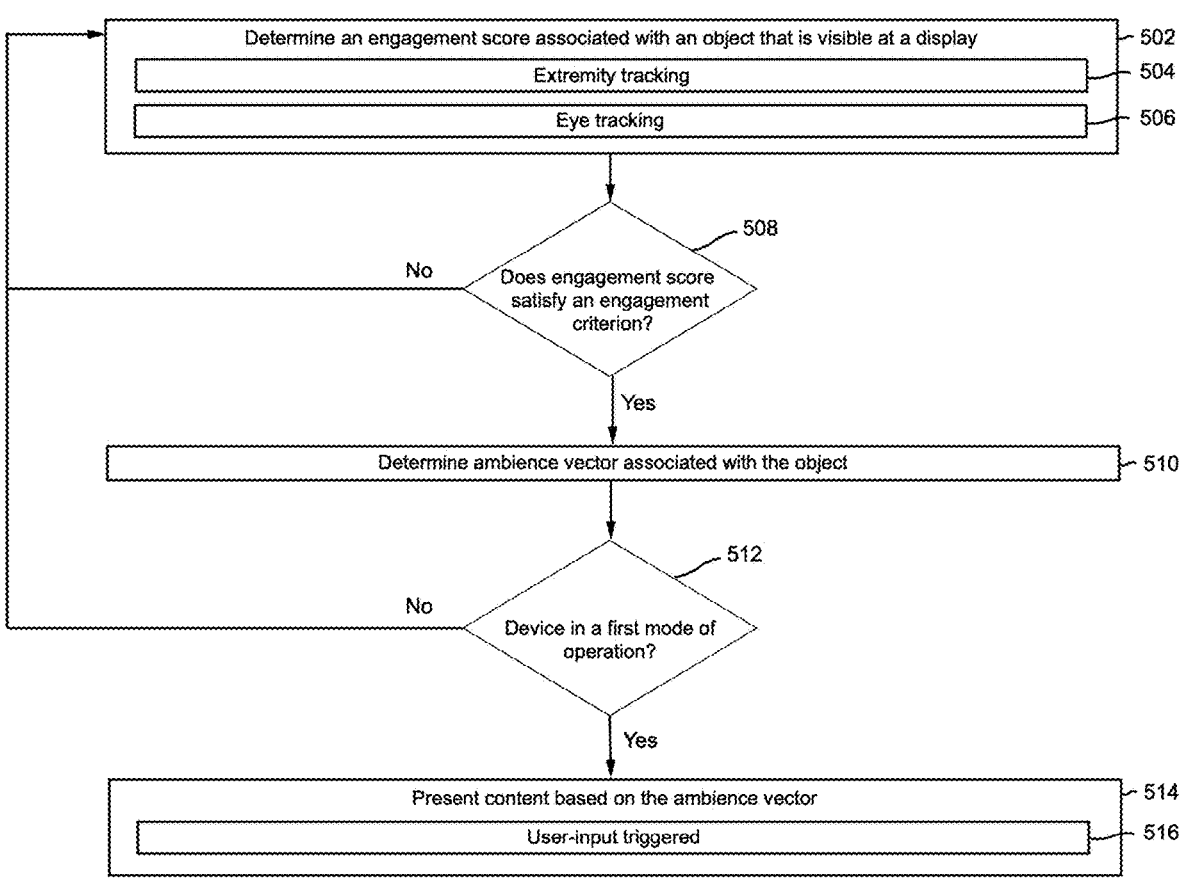
FIG. 5 is an example of a flow diagram of a method of presenting content based on an ambience vector in accordance with some implementations.

FIG. 5 is an example of a flow diagram of a method 500 of presenting content based on an ambience vector in accordance with some implementations. In various implementations, the method 500 or portions thereof are performed by an electronic device (e.g., the electronic device 100 in FIG. 1 or the electronic device 210 in FIGS. 2A-2I or FIGS. 3A-3H). In various implementations, the method 500 or portions thereof are performed by the system 400. In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes determining an engagement score associated with an object visible at (e.g., viewable on) a display. The engagement score characterizes a level of user engagement with respect to the object. The engagement score may characterize the extent to which a user is focused on the object, such as for how long the user is focused on the object, how often focus is diverted to a different object, etc.

According to various implementations, determining the engagement score includes performing a tracking function that is associated with a user. In some implementations, as represented by block 504, the tracking function corresponds to extremity tracking. For example, with reference to FIGS. 2E and 2F, an extremity tracking sensor outputs extremity tracking data indicating that an extremity of the user 50 is engaging with the particular raindrop 244. Continuing with this example, the method 500 includes determining, based on the extremity tracking data, an engagement score that characterizes a level of user engagement with respect to the particular raindrop 244. In some implementations, as represented by block 506, the tracking function corresponds to eye tracking. For example, with reference to FIGS. 3B and 3C, an eye tracking sensor outputs eye tracking data indicating that an eye gaze of the user 50 is focused on the particular balloon 306. Continuing with this example, the method 500 includes determining, based on the eye tracking data, an engagement score that characterizes a level of user engagement with respect to the particular balloon 306.

As represented by block 508, in some implementations, the method 500 includes determining whether or not the engagement score satisfies an engagement criterion. Examples of the engagement criterion are provided with reference to the method 600. In response to determining that the engagement score satisfies the engagement criterion, the method 500 proceeds to a portion of the method 500 represented by block 510. On the other hand, in response to determining that the engagement score does not satisfy the engagement criterion, the method 500 reverts back to the portion of the method 500 represented by block 502.

As represented by block 510, the method 500 includes, in response to determining that the engagement score satisfies the engagement criterion, determining an ambience vector associated with the object. The ambience vector represents a target ambient environment. In some implementations, the ambience vector includes one or more values that characterize an ambient light, sound, mood, or weather of the target ambient environment. For example, the ambience vector includes a combination of various ambience values, such as lighting values (e.g., brightness value, chromaticity value), sound values (e.g., volume value, rhythm value, musical genre value), mood values (e.g., upbeat value, melancholy value), etc.

As represented by block 512, in some implementations, the method 500 includes determining whether or not the electronic device is in a first mode of operation (e.g., an ambience-enabled mode of operation). For example, in some implementations, the method 500 includes detecting, via an input device, a user input directing the electronic device to enter the first mode of operation. In some implementations, the method 500 includes displaying an ambience-mode affordance for enabling or disabling the electronic device entering the first mode of operation. In some implementations, in response to determining that the electronic device is in the first mode of operation, the method 500 proceeds to a portion of the method 500 represented by block 514. On the other hand, in response to determining that the electronic device is not in the first mode of operation, the method 500 reverts back to the portion of the method 500 represented by block 502.

As represented by block 514, the method 500 includes, in response to determining that the engagement score satisfies the engagement criterion, presenting content based on the ambience vector. In some implementations, the content may correspond to a combination of displayable content and audio content. In some implementations, the method 500 includes presenting the ambience vector based on determining that the electronic device is in the first mode of operation. For example, an electronic device presents the ambience vector in response to detecting the user input directing the electronic device to enter the first mode of operation. On the other hand, in response to determining that the electronic device is not in the first mode of operation, the method 500 includes foregoing presenting content.

As represented by block 516, in some implementations, the method includes detecting, via an input device, a user input. In response to detecting the user input, in accordance with a determination that the user input is directed towards presenting content associated with the object, presenting the content, and in accordance with a determination that the user input is not directed towards presenting the content associated with the object, foregoing presenting the content.

Figure 6:
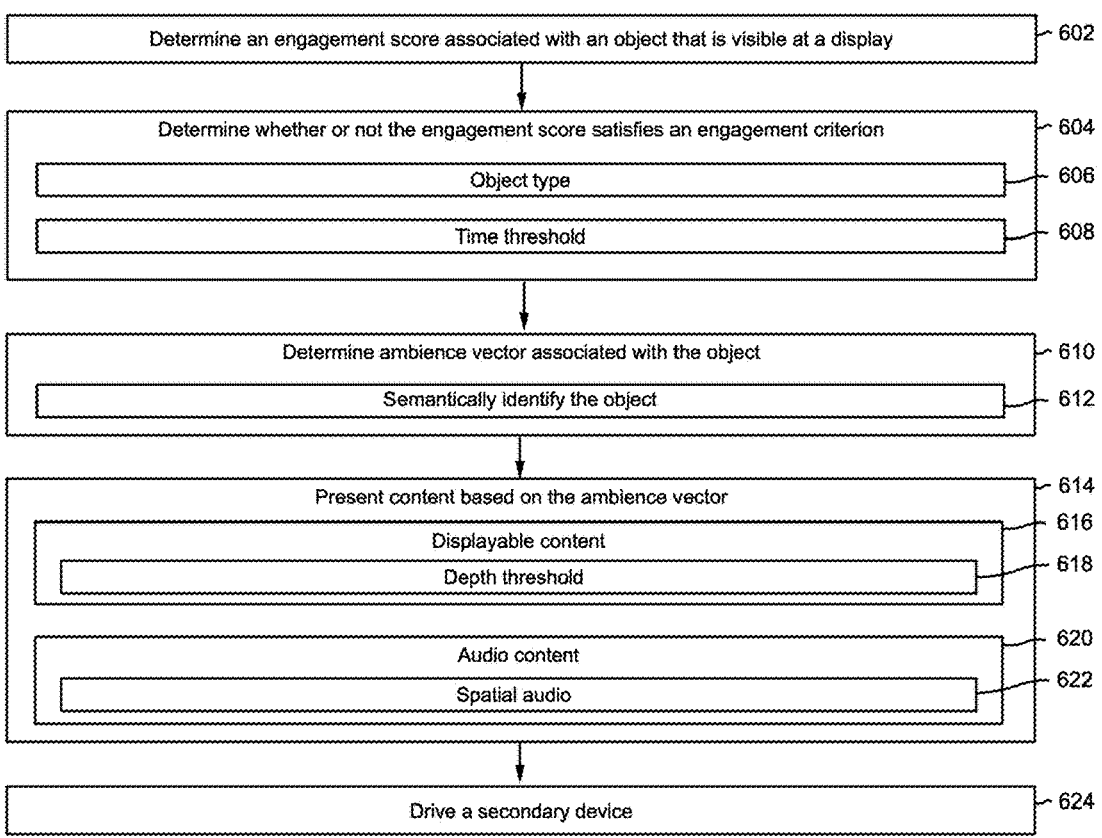
FIG. 6 is another example of a flow diagram of a method of presenting content based on an ambience vector in accordance with some implementations.

FIG. 6 is another example of a flow diagram of a method 600 of presenting content based on an ambience vector in accordance with some implementations. In various implementations, the method 600 or portions thereof are performed by an electronic device (e.g., the electronic device 100 in FIG. 1 or the electronic device 210 in FIGS. 2A-2I or FIGS. 3A-3H). In various implementations, the method 600 or portions thereof are performed by the system 400. In various implementations, the method 600 or portions thereof are performed by a head-mountable device (HMD). In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

As represented by block 602, the method 600 includes determining an engagement score associated with an object visible at a display.

As represented by block 604, in some implementations, the method 600 includes determining whether or not the engagement score satisfies an engagement criterion. For example, as represented by block 606, the engagement score satisfies the engagement criterion when the object is of a predetermined object type. As one example, the predetermined object type is a picture, lamp, album cover, etc., but not a blank structural element, such as a white wall. As another example, as represented by block 608, the engagement score satisfies the engagement criterion when the level of user engagement exceeds an engagement threshold for a threshold amount of time. For example, with reference to FIG. 2F, the tracker 240 provides tracking data that indicates that an eye gaze of the user 50 has been directed at the particular raindrop 244 for more than the threshold amount of time (e.g., more than three seconds).

As represented by block 610, the method 600 includes, in response to determining that the engagement score satisfies the engagement criterion, determining an ambience vector associated with the object. The ambience vectors represents a target ambient environment. In some implementations, as represented by block 612, the method 600 includes obtaining a semantic value. For example, with reference to FIG. 2H, when the painting 220 is a physical painting hanging on a wall 216, the method 600 includes obtaining a first semantic value associated with the cloud 222, a second semantic value associated with the raindrops 224, and a third semantic value associated with the person holding an umbrella 226. Moreover, in some implementations, the method 600 includes determining the ambience vector based on the semantic value(s).

As represented by block 614, the method 600 includes, in response to determining that the engagement score satisfies the engagement criterion, presenting content based on the ambience vector. For example, as represented by block 616, the content corresponds to displayable content, such as the computer-generated raindrops 252 illustrated in FIG. 2I.

In some implementations, the method 600 includes displaying the displayable content at a determined location in order to provide a more immersive experience. To that end, in some implementations, the method 600 includes identifying a second object based on the ambience vector, determining a spatial relationship between the electronic device and the second object, and displaying the displayable content is displayed based on a function of the spatial relationship. For example, with reference to FIGS. 2H and 2I, in response to determining the first ambience value 250-1 of "Raining," the electronic device 210 displays the computer-generated raindrops 252 near the ceiling 218 in order to simulate raindrops falling through the ceiling. In some implementations, as represented by block 618, the displayable content satisfies a depth threshold with respect to the display. For example, the displayable content is displayed so as to appear less than a threshold distance from the display, in order to prevent physical objects from occluding the displayable content.

As represented by block 620, in some implementations, the content corresponds to audio content. To that end, in some implementations, an electronic device includes a speaker, and the method 600 includes playing, via the speaker, the audio content. For example, in response to determining, based on extremity tracking data, that a user is holding a music album, the electronic device streams and plays a song from the album.

As represented by block 622, in some implementations, the audio content corresponds to spatial audio in order to provide a more immersive experience. To that end, in some implementations, the method 600 includes identifying a second object based on the ambience vector, determining a spatial relationship between the electronic device and the second object, and playing the audio content, as spatial audio, based on a function of the spatial relationship. From the perspective of a user of an electronic device, the spatial audio seems to emanate from the second object. An example of the electronic device 210 playing spatial audio of raindrops is described with reference to FIG. 2I.

As represented by block 624, in some implementations, the method 600 includes transmitting instructions to a secondary device in order to drive an operation of the secondary device. The instructions are a function of the ambience vector. For example, the method 600 includes transmitting instructions to a smart home system in order to drive the smart home system to dim the lights, play a song, change a room's temperature, and/or the like.

Figure 7:
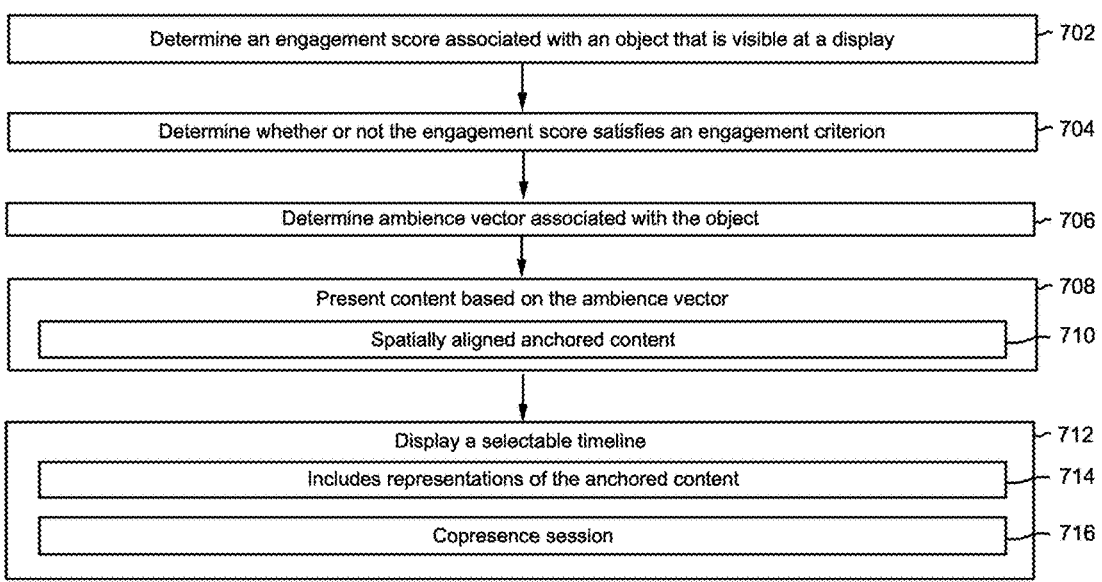
FIG. 7 is an example of a flow diagram of a method of presenting anchored content in accordance with some implementations.

FIG. 7 is an example of a flow diagram of a method 700 of presenting anchored content in accordance with some implementations. In various implementations, the method 700 or portions thereof are performed by an electronic device (e.g., the electronic device 100 in FIG. 1 or the electronic device 210 in FIGS. 2A-2I or FIGS. 3A-3H). In various implementations, the method 700 or portions thereof are performed by the system 400. In various implementations, the method 700 or portions thereof are performed by a head-mountable device (HMD). In some implementations, the method 700 is performed by processing logic, including hardware, firmware, software, or a combination thereof. In some implementations, the method 700 is performed by a processor executing code stored in a non-transitory computer-readable medium (e.g., a memory). In various implementations, some operations in method 700 are, optionally, combined and/or the order of some operations is, optionally, changed.

As represented by block 702, the method 700 includes determining an engagement score associated with an object visible at a display. As represented by block 704, in some implementations, the method 700 includes determining whether or not the engagement score satisfies an engagement criterion. As represented by block 706, the method 700 includes, in response to determining that the engagement score satisfies the engagement criterion, determining an ambience vector associated with the object.

As represented by block 708, the method 700 includes, in response to determining that the engagement score satisfies the engagement criterion, presenting content. As represented by block 710, in some implementations, the method 700 includes presenting spatially aligned anchored content, such as is described with reference to FIGS. 3A-3H. For example, the anchored content corresponds to content that was previously obtained (e.g., captured via an image senor) within an operating environment that is associated with an electronic device performing the method 700. For example, with reference to FIG. 3E, the third image 340 includes the table 302, which is also included in the operating environment 300 that is currently associated with the electronic device 210. In some implementations, the anchored content corresponds to one of an image, a video stream, an audio recording, or other media content. For example, the anchored content is a happy birthday song that was previously recorded by the electronic device when the electronic device was within the current operating environment of the electronic device.

As represented by block 712, in some implementations, the method 700 includes displaying, on the display, a selectable timeline. As represented by block 714, the selectable timeline includes representations of the anchored content. For example, the representations include a plurality of images that were previously captured (e.g., via an image sensor) within the current operating environment of the electronic device. In some implementations, the timeline includes a plurality of thumbnails respectively associated with the plurality of images. As another example, in some implementations, the timeline includes a plurality of sound clips respectively associated with a plurality of sound clips that were previously recorded (e.g., via a microphone) within the current operating environment of the electronic device. In some implementations, the selectable timeline includes a scrubber interface that enables a user to scrub through the timeline in order to access different anchored content.

In some implementations, in response to receiving an input directed to one of the representations of the anchored content, the method 700 includes presenting corresponding anchored content within the second region. For example, based on extremity tracking data, an electronic device determines that a user is selecting a particular thumbnail representing a video of children singing happy birthday around a table. Continuing with this example, the electronic device accordingly displays the video as spatially aligned to the table.

As represented by block 716, in some implementations, the electronic device is associated with a copresence session that is also associated with a second electronic device. The copresence session enables display of the selectable timeline on a second display of the second electronic device. Accordingly, in some implementations, a first user of the electronic device and a second user of the second electronic device may concurrently experience anchored content within a common operating environment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be openended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms: furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device with one or more processors, a non-transitory memory, and a display:
displaying, on the display, a representation of an operating environment;
determining an engagement score associated with an object within the operating environment, wherein the engagement score characterizes a level of user engagement with respect to the object; and
in response to determining that the engagement score satisfies an engagement criterion:
obtaining one or more semantic values of the object and generating an ambience vector associated with the object, wherein the ambience vector specifies at least one of a sound, a mood or weather conditions for the representation of the operating environment derived from the one or more semantic values of the object; and
presenting content in the representation of the operating environment by outputting audio that corresponds to the sound or by displaying a virtual object that corresponds to the mood or the weather conditions specified by the ambience vector.

2. The method of claim 1, further comprising:
detecting, via an input device, a user input; and
in response to detecting the user input:
in accordance with a determination that the user input is directed towards presenting content associated with the object, presenting the content; and
in accordance with a determination that the user input is not directed towards presenting the content associated with the object, foregoing presenting the content.

3. The method of claim 1, wherein the electronic device is in a first mode of operation, and wherein presenting the content is further based on determining that the electronic device is in the first mode of operation.

4. The method of claim 3, further comprising detecting, via an input device, a user input directing the electronic device to enter the first mode of operation, wherein presenting the content is further based on detecting the user input.

5. The method of claim 1, wherein the electronic device includes an extremity tracker that outputs extremity tracking data, and wherein determining the engagement score is based on a function of the extremity tracking data.

6. The method of claim 1, wherein the electronic device includes an eye tracker that outputs eye tracking data, and wherein determining the engagement score is based on a function of the eye tracking data.

7. The method of claim 1, wherein the engagement score satisfies the engagement criterion when the user engagement spatially corresponds to the object.

8. The method of claim 1, wherein the object corresponds to a physical object.

9. The method of claim 8, further comprising obtaining a semantic value associated with the physical object, wherein the ambience vector is based on the semantic value.

10. The method of claim 8, wherein the electronic device includes an image sensor, wherein the image sensor is associated with a capture region that includes the physical object, wherein the image sensor outputs image data representing the physical object, and wherein the display displays the image data representing the physical object.

11. The method of claim 8, wherein the display corresponds to a see-through display, and wherein the physical object is visible through the see-through display.

12. The method of claim 1, wherein the object corresponds to a computer-generated object.

13. The method of claim 1, wherein the electronic device includes a speaker, wherein the content corresponds to audio content, and wherein presenting the content includes playing, via the speaker, the audio content.

14. The method of claim 13, further comprising:
identifying a second object based on the ambience vector;
determining a spatial relationship between the electronic device and the second object; and
playing the audio content, as spatial audio, based on a function of the spatial relationship.

15. The method of claim 1, wherein the content corresponds to displayable content, and wherein presenting the content includes displaying, on the display, the displayable content.

16. The method of claim 15, further comprising:
identifying a second object based on the ambience vector; and
determining a spatial relationship between the electronic device and the second object;
wherein the displayable content is displayed based on a function of the spatial relationship.

17. The method of claim 15, wherein the displayable content satisfies a depth threshold with respect to the display.

18. The method of claim 1, wherein the ambience vector includes one or more values that characterize an ambient light, an ambient sound, or ambient weather of a target ambience of the representation of the operating environment.

19. The method of claim 1, further comprising:
in response to determining that the engagement score satisfies an engagement criterion:
transmitting, to a second electronic device, an instruction to change an operating characteristic of the operating environment based on the ambience vector.

20. A non-transitory memory storing one or more programs, which, when executed by one or more processors of a device, cause the device to:
display, on a display, a representation of an operating environment;
determine an engagement score associated with an object within the operating environment, wherein the engagement score characterizes a level of user engagement with respect to the object; and
in response to determining that the engagement score satisfies an engagement criterion:
obtain one or more semantic values of the object and generate an ambience vector associated with the object, wherein the ambience vector specifies at least one of a sound, a mood or weather conditions for the representation of the operating environment derived from the one or more semantic values of the object; and
present content in the representation of the operating environment by outputting audio that corresponds to the sound or by displaying a virtual object that corresponds to the mood or the weather conditions specified by the ambience vector.

21. An electronic device comprising:
one or more processors;

a non-transitory memory;

a display; and one or more programs, wherein the one or more programs are stored in the non-transitory memory and configured to be executed by the one or more processors, the one or more programs including instructions for:

displaying, on the display, a representation of an operating environment;

determining an engagement score associated with an object within the operating environment, wherein the engagement score characterizes a level of user engagement with respect to the object; and in response to determining that the engagement score satisfies an engagement criterion:

obtain one or more semantic values of the object and generate an ambience vector associated with the object, wherein the ambience vector specifies at least one of a sound, a mood or weather conditions for the representation of the operating environment derived from the one or more semantic values of the object; and presenting content in the representation of the operating environment by outputting audio that corresponds to the sound or by displaying a virtual object that corresponds to the mood or the weather conditions specified by the ambience vector.

\* \* \* \* \*